United States Patent
Ukita et al.

(10) Patent No.: US 9,078,258 B2
(45) Date of Patent: Jul. 7, 2015

(54) CONTROLLER, COMMUNICATION TERMINAL, AND WIRELESS COMMUNICATION SYSTEM

(75) Inventors: Yosuke Ukita, Osaka (JP); Hironori Nakae, Osaka (JP); Hiroshi Hayashino, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 231 days.

(21) Appl. No.: 13/818,706

(22) PCT Filed: Jul. 19, 2012

(86) PCT No.: PCT/JP2012/004606
§ 371 (c)(1),
(2), (4) Date: Feb. 25, 2013

(87) PCT Pub. No.: WO2013/018303
PCT Pub. Date: Feb. 7, 2013

(65) Prior Publication Data
US 2013/0170426 A1  Jul. 4, 2013

(30) Foreign Application Priority Data
Jul. 29, 2011 (JP) .................... 2011-167356

(51) Int. Cl.
*H04W 72/04* (2009.01)
*H04W 52/02* (2009.01)
*H04W 72/10* (2009.01)

(52) U.S. Cl.
CPC ...... *H04W 72/0446* (2013.01); *H04W 52/0216* (2013.01); *H04W 72/10* (2013.01); *Y02B 60/50* (2013.01)

(58) Field of Classification Search
CPC ............ H04W 72/0446; H04W 72/10; H04W 52/0216
USPC .................... 370/311, 312, 523, 528
See application file for complete search history.

(56) References Cited

U.S. PATENT DOCUMENTS

| | | |
|---|---|---|
| 7,885,244 B2 | 2/2011 | Bhatti et al. |
| 7,936,709 B2 | 5/2011 | Bhatti et al. |

(Continued)

FOREIGN PATENT DOCUMENTS

| | | |
|---|---|---|
| JP | 2000-023265 | 1/2000 |
| JP | 2011-517142 | 5/2011 |

(Continued)

OTHER PUBLICATIONS

International Search Report issued Sep. 4, 2012 in International (PCT) Application No. PCT/JP2012/004606.

*Primary Examiner* — Ming Jung
(74) *Attorney, Agent, or Firm* — Wenderoth, Lind & Ponack, L.L.P.

(57) ABSTRACT

A control point device that reduces delay in a power-saving wireless network includes a normal data generating unit that generates $1^{st}$-type data, a preferential data generating unit that generates $2^{nd}$-type data different from the $1^{st}$-type data, a determining unit that determines an active period length, a beacon generating unit that generates a broadcasting signal including information corresponding to the determined length of the active period, and a transmitting unit that transmits the broadcasting signal to the terminal on a frame basis. The determining unit shortens the length of the active period when the preferential data generating unit generates the $2^{nd}$-type data, and a preferential data period is set in an ex-active period obtained by the shortening of the active period, the preferential data period being a period during which the $2^{nd}$-type data is transmitted. The transmitting unit transmits the $2^{nd}$-type data to the terminal during the preferential data period.

17 Claims, 22 Drawing Sheets

(56) References Cited

U.S. PATENT DOCUMENTS

| | | |
|---|---|---|
| 8,218,661 B2 | 7/2012 | Bhatti et al. |
| 8,755,316 B2 * | 6/2014 | Aschan et al. ............... 370/311 |
| 2002/0064140 A1 * | 5/2002 | Numminen ................. 370/311 |
| 2003/0101049 A1 * | 5/2003 | Lakaniemi et al. .......... 704/214 |
| 2005/0201311 A1 * | 9/2005 | Willey et al. ................ 370/311 |
| 2006/0104251 A1 * | 5/2006 | Park ............................. 370/338 |
| 2009/0175186 A1 * | 7/2009 | Du et al. ...................... 370/252 |
| 2009/0238160 A1 | 9/2009 | Bhatti et al. |
| 2009/0238293 A1 | 9/2009 | Bhatti et al. |
| 2009/0257410 A1 * | 10/2009 | Liu ............................... 370/336 |
| 2010/0128706 A1 * | 5/2010 | Lee et al. ..................... 370/338 |
| 2010/0232415 A1 | 9/2010 | Hayashino et al. |
| 2011/0038343 A1 | 2/2011 | Bhatti et al. |

FOREIGN PATENT DOCUMENTS

| | | |
|---|---|---|
| WO | 2009/116681 | 9/2009 |
| WO | 2010/007739 | 1/2010 |

* cited by examiner

FIG. 15

| Channel name | The number of associated terminals |
|---|---|
| Basic CH1 | 10 |
| Basic CH2 | 5 |

FIG. 18

| Channel name | The number of associated terminals |
|---|---|
| Basic CH1 | 5 |
| Basic CH2 | 30 |

CONTROLLER, COMMUNICATION TERMINAL, AND WIRELESS COMMUNICATION SYSTEM

TECHNICAL FIELD

The present invention relates to a controller, a communication terminal, and a wireless communication system.

BACKGROUND ART

In recent years, attention has been directed toward a wireless network using a low-power-consumption wireless device, such as WPAN (Wireless Personal Area Network) typified by the IEEE (Institute of Electrical and Electronics Engineers) 802.15 standard and a sensor network.

For example, Patent Literature (PTL) 1 discloses a technique for preventing collision between packets. According to this technique, a connector corresponding to a controller generates a reference clock and reference timing on the basis of transmitted data. Accordingly, a TDMA slot used by the controller can be prevented from overlapping with a TDMA slot used by another controller. As a result, it is possible to prevent the collision between packets, which is caused when the number of communication terminals connected to the controller increases.

CITATION LIST

Patent Literature

[PTL 1] Japanese Unexamined Patent Publication No. 2000-23265

SUMMARY OF INVENTION

Technical Problem

However, in the case where the number of the communication terminals becomes larger than or equal to a certain value, transmission delay disadvantageously increases.

Thus, the present invention is conceived in consideration of this problem, and its object is to provide a controller, a communication terminal, and a wireless communication system that can reduce delay in a power-saving wireless network.

Solution to Problem

To attain the object, a controller from an aspect of the present invention includes a normal data generating unit configured to generate $1^{st}$-type data; a preferential data generating unit configured to generate $2^{nd}$-type data that is different from the $1^{st}$-type data; a determining unit configured to determine a length of an active period included in a frame that is repetitive unit time, the active period being a period during which communication with a terminal in the frame is performed; a signal generating unit configured to generate a broadcasting signal including information corresponding to the determined length of the active period; and a transmitting unit configured to transmit the broadcasting signal to the terminal on a frame basis by wireless communication with the terminal, and to transmit the $1^{st}$-type data during the active period, wherein: the determining unit is configured to shorten the length of the active period in the case where the preferential data generating unit generates the $2^{nd}$-type data as compared to the case where the preferential data generating unit does not generate the 2nd-type data, and to set a preferential data period in an ex-active period obtained by the shortening of the active period, the preferential data period being a period during which the $2^{nd}$-type data is transmitted, and the transmitting unit is configured to transmit the $2^{nd}$-type data to the terminal during the preferential data period.

The present invention is not necessarily implemented by such controller and communication terminal. For example, the present invention can be implemented by a communicating method for use in the controller and a communicating method for use in the communication terminal, which has characteristic means included in the controller and the communication terminal as steps. The present invention can be also implemented by a program for causing a computer to perform the characteristic steps. As a matter of course, such program can be distributed in a recording medium such as a CD-ROM (Compact Disc Read Only Memory) or via a transmission medium such as the Internet.

The present invention can be also implemented by a semiconductor integrated circuit (LSI) that performs some or all of functions of the controller and the communication terminal, or by a wireless communication system including the controller and the communication terminal.

Advantageous Effects of Invention

As described above, the present invention can provide a controller, a communication terminal, and a wireless communication system that can reduce delay in the power-saving wireless network. Therefore, in these days when improvement of a power-saving performance in general communication devices is in high demand, the practical worth of the present invention is extremely high.

BRIEF DESCRIPTION OF DRAWINGS

FIG. 15 is a view showing an example of the number of communication terminals assigned to each channel in the wireless communication system in accordance with Embodiment 2.

FIG. 18 is a view showing another example of the number of communication terminals assigned to each channel in the wireless communication system in accordance with Embodiment 2.

DESCRIPTION OF EMBODIMENTS

Findings as a Basis for the Present Invention

The present inventor found that the controller described in [Background Art] had following problems.

Figure 23:
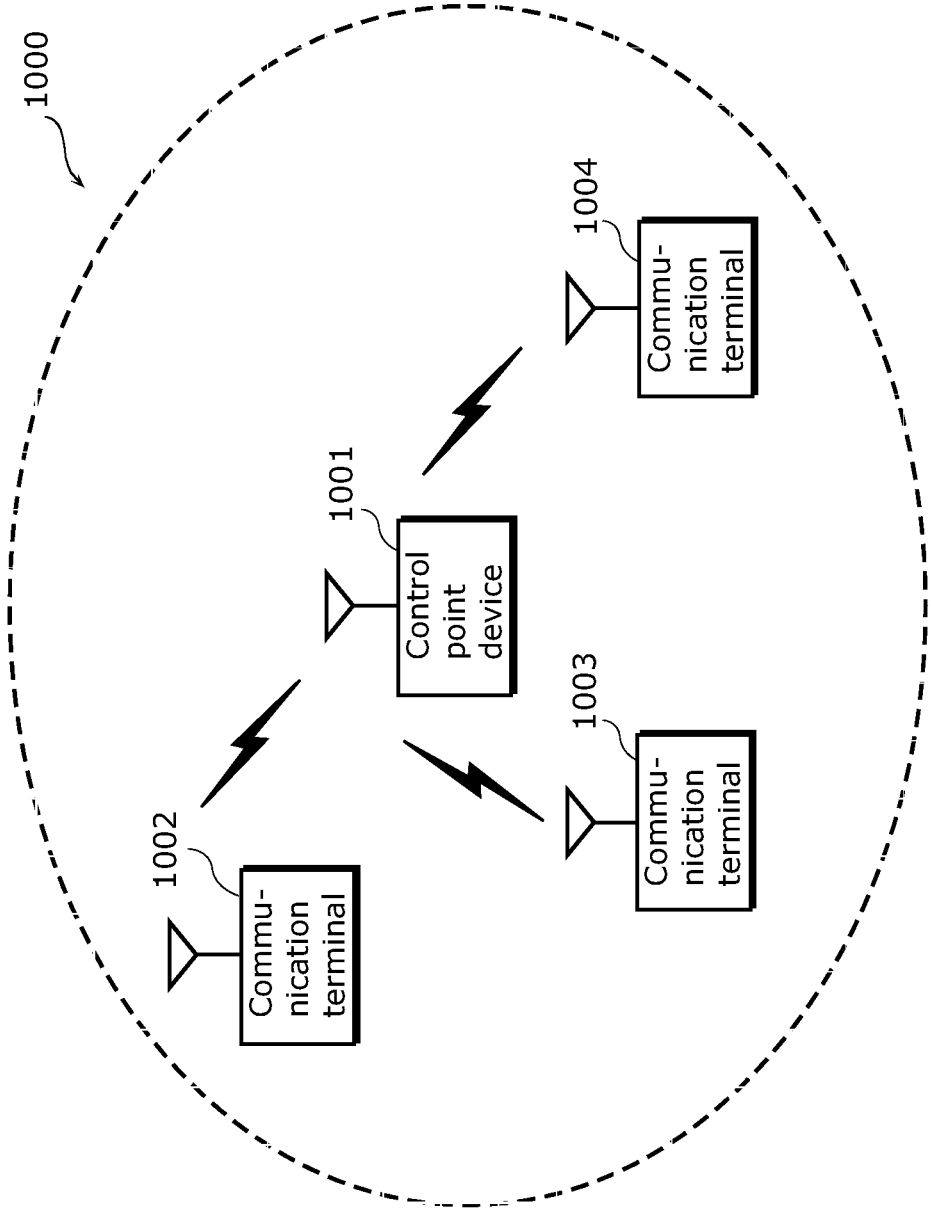
FIG. 23 is a view showing an overview of a wireless communication system according to a related art of the present invention.

FIG. 23 shows an example of a wireless network using a low-power-consumption wireless device. In FIG. 23, a wireless communication system 1000 is configured of a control point device 1001 and communication terminals 1002 to 1004. Hereinafter, the control point device and the communication terminals may be collectively referred to as a wireless device. The control point device may be referred to as a controller.

The control point device 1001 periodically broadcasts a beacon including control information for synchronization of communication timing to the communication terminals 1002 to 1004. Based on the control information included in the beacon, the communication terminals 1002 to 1004 communicate with the control point device 1001.

Various types of methods for access control between the control point device and a plurality of communication terminals can be adopted. For example, access control methods such as the CSMA (Carrier Sense Multiple Access/Collision Detection), the TDMA (Time Division Multiple Access), and the FDMA (Frequency Division Multiple Access) can be used.

The wireless communication system 1000 is characteristic of its power-saving performance. Specifically, in a repetitive communication unit in wireless communication between the control point device and the communication terminal, a shorter period called active period is set. The active period used herein means a period during which data is transmitted/received between the control point device and the communication terminal. In the control point device, a module performing a communication function can be turned off during a period other than the active period. In the communication terminal, even during the active period, if communication is not scheduled, the module performing the communication function can be turned off. The control point device and the communication terminal can recognize the timing of power-on after power-off according to information included in the beacon. As a result, during a period when communication is not required, the wireless device can turn off the communication function, thereby reducing power consumed in the entire wireless network.

In such power-saving wireless network, in addition to the power-saving performance, reduction of delay may be demanded, for example, in the case where a control signal for peak cut control is transmitted from the controller to the communication terminal. The peak cut control means decreasing a peak value of power consumed by consumers to be smaller than or equal to a predetermined value. For example, it is assumed that the sum of the power consumed by the consumers comes near to the predetermined value. When another electrical product is turned on in this state, it is need to suppress the peak value of power consumption by temporarily decreasing power consumption of any of electrical products consuming power. For example, the controller can transmit a control signal for instructing the communication terminal as an air conditioner to perform the peak cut control.

When transmission delay of the control signal is large, the peak cut control cannot be performed at a proper timing. In this case, the power consumption peak value exceeds a previously contracted value. As a result, there causes a disadvantage such as extra electricity charges on the consumers. Accordingly, it is required to reduce delay in the low-power-consumption wireless communication network.

Figure 24:
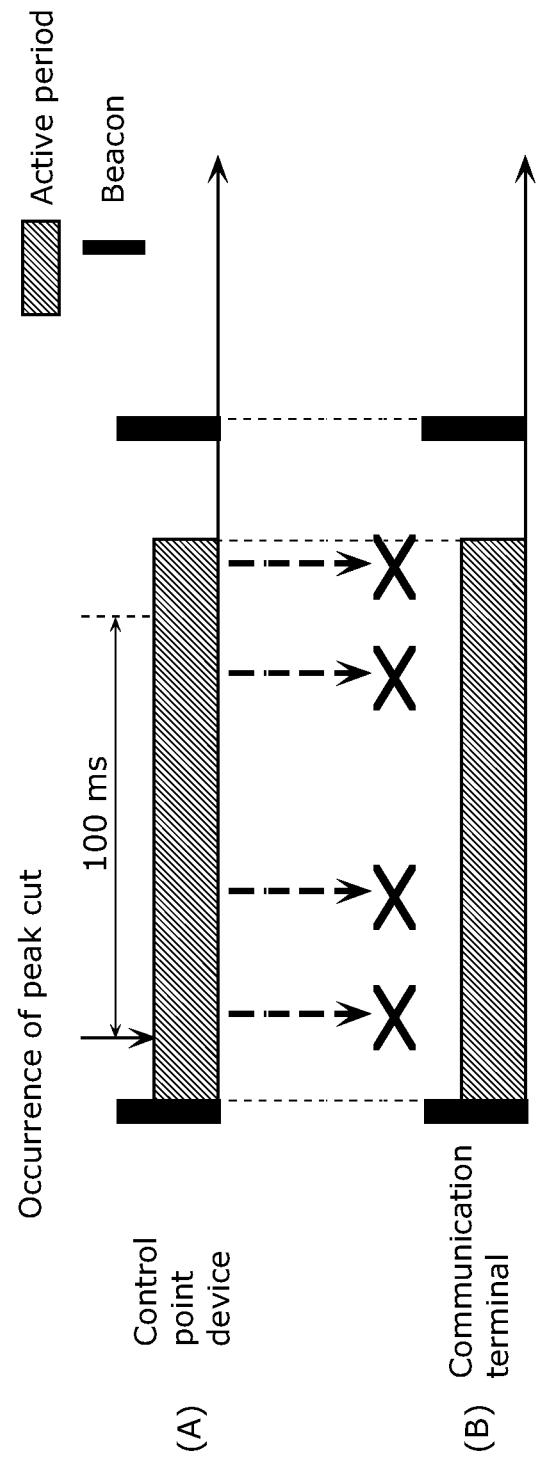
FIG. 24 is a view for describing delay in data communication, which is caused by collision between packets.

One of main factors contributing to the delay in the wireless network is the collision between packets as shown in FIG. 24. In this figure, the control signal for the peak cut control is generated, and the control signal for the peak cut control needs to be transmitted from the control point device to the communication terminal within 100 ms from the occurrence of the collision. However, a packet of communication data transmitted/received between the control point device and the communication terminal may collide with a packet of the control signal for peak cut control. As a result, even when the control signal for peak cut control is repeatedly transmitted, the control signal cannot be transmitted from the control point device to the communication terminal within 100 ms.

For example, PTL 1 discloses a technique for preventing the collision between packets. According to the technique, the connector corresponding to the control point device generates a reference clock and reference timing on the basis of transmitted data. Accordingly, a TDMA slot used by the control point device can be prevented from overlapping with a TDMA slot used by another control point device. As a result, it is possible to prevent the collision between packets, which is caused when the number of communication terminals connected to the control point device increases.

However, according to the technique disclosed in PTL 1, a TDMA slot cycle is determined to be longer as the number of the communication terminals increases. Thus, in the case where the number of the communication terminals becomes larger than or equal to a certain value, the transmission delay disadvantageously increases.

Thus, the present invention is conceived in consideration of the problem, and its object is to provide a controller, a communication terminal, and a wireless communication system that can reduce delay in the power-saving wireless network.

To attain the object, a controller from an aspect of the present invention includes a normal data generating unit configured to generate $1^{st}$-type data; a preferential data generating unit configured to generate $2^{nd}$-type data that is different from the $1^{st}$-type data; a determining unit configured to determine a length of an active period included in a frame that is repetitive unit time, the active period being a period during which communication with a terminal in the frame is performed; a signal generating unit configured to generate a broadcasting signal including information corresponding to the determined length of the active period; and a transmitting unit configured to transmit the broadcasting signal to the terminal on a frame basis by wireless communication with the terminal, and to transmit the $1^{st}$-type data during the active period, wherein: the determining unit is configured to shorten the length of the active period in the case where the preferential data generating unit generates the $2^{nd}$-type data as compared to the case where the preferential data generating unit does not generate the 2nd-type data, and to set a preferential data period in an ex-active period obtained by the shortening of the active period, the preferential data period being a period during which the $2^{nd}$-type data is transmitted, and the transmitting unit is configured to transmit the $2^{nd}$-type data to the terminal during the preferential data period.

With this configuration, in the case where the $2^{nd}$-type data is generated, the controller shortens the active period such that the predetermined preferential data period and active period do not overlap with each other. During the preferential data period, devices other than the controller must execute the reception processing. Accordingly, in the case where the controller transmits the $2^{nd}$-type data during the preferential data period, the probability that the $2^{nd}$-type data collides with the $1^{st}$-type data transmitted from the communication terminal is decreased. Therefore, in the case of transmitting the $2^{nd}$-type data, delay can be reduced.

For example, the signal generating unit may be configured to generate a first broadcasting signal including information corresponding to the shortened length of the active period, which is determined by the determining unit, and the transmitting unit may be configured to transmit the $1^{st}$-type data during the active period, transmit the first broadcasting signal, and transmit the $2^{nd}$-type data during the preferential data period included in a frame subsequent to a frame in which the first broadcasting signal is transmitted.

With this configuration, the transmitting unit can transmit the $2^{nd}$-type type data during the preferential data period that does not overlap with the active period. As a result, the probability that the $2^{nd}$ type data collides with other data can be further reduced.

For example, the frame may include the active period and a non-active period in which wireless communication of the $1^{st}$-type data between the controller and the communication terminal is not performed, and the determining unit may be configured to shorten the length of the active period from a predetermined length of the active period to cause the non-active period of a predetermined time or more to be included before the preferential data period included in the same frame.

With this configuration, even during a predetermined period immediately before the preferential data period, the probability that data other than the $2^{nd}$-type data is decreased. Accordingly, the probability that the $2^{nd}$-type data collides with other data during the preferential data period can be further decreased.

For example, the transmitting unit may be configured to transmit the first broadcasting signal in a frame next to a frame in which the $2^{nd}$-type data is generated, and transmit the $2^{nd}$-type data during the preferential data period included in the same frame that is the frame in which the first broadcasting signal is transmitted.

For example, during the preferential data period, the communication terminal may be in a reception state at all times.

With this configuration, during the preferential data period, the $1^{st}$-type data is not transmitted from the communication terminal. Accordingly, in the case where the controller transmits the $2^{nd}$-type data, collision between the $1^{st}$-type data and the $2^{nd}$-type data can be prevented.

For example, the wireless communication system may further include: the plurality of communication terminals; a channel setting unit configured to divide a communication channel of the wireless communication into a plurality of first channels, and assign at least one of the first channels to each of the plurality of communication terminals; and a selecting unit configured to select, as a target channel, a channel to which a smaller number of the communication terminals are assigned from among the first channels, each of the first channels may include the plurality of frames as the repetitive unit time in the wireless communication using the channel, wherein the preferential data period associated with the plurality of frames included in each of the first channels may be previously determined, the signal generating unit may be configured to generate the broadcasting signal including information corresponding to the length of the active period, for each of the frames included in each of the first channels, the transmitting unit may be configured to transmit the broadcasting signal through the first channel, for each of the frames included in each of the first channels, and the determining unit may be configured to shorten the length of the active period included in at least one first frame in the plurality of frames included in the target channel from a predetermined length of the active period, in the case where the preferential data generating unit generates the $2^{nd}$-type data, thereby preventing the active period from overlapping with the preferential data period associated with the first frame.

With this configuration, in the case where the communication channel is divided into the plurality of channels, the controller refers to the number of the communication terminals assigned to each channel. Then, the controller shortens the active period of the channel to which the smaller number of the communication terminals are assigned. As a result, delay in transmission of the $2^{nd}$-type data can be reduced while suppressing the effect of the shortening of the active period on the wireless communication system.

For example, the channel setting unit may be configured to divide in a frequency domain the communication channel of the wireless communication into the first channels and a second channel that is different from the first channels and serves to transmit and receive the $2^{nd}$-type data, and to assign at least one of the first channels and the second channel to each of the plurality of communication terminals, and the plurality of communication terminals may be in a reception state in the second channel during the preferential data period through the.

With this configuration, by providing a dedicated channel for transmission/reception of the $2^{nd}$-type data, irrespective of the number of the other channels, the $2^{nd}$-type data can be transmitted/received with less delay time.

For example, the signal generating unit may be configured to generate a second broadcasting signal that is a broadcasting signal including information corresponding to the shortened length of the active period, which is determined by the determining unit, and the transmitting unit may be configured to transmit the second broadcasting signal in the first frame, and transmit the $2^{nd}$-type data during the preferential data period associated with the first frame through the second channel.

For example, the selecting unit may be configured to refer to a predetermined allowable delay value that is a delay time allowable for reception of the $2^{nd}$-type data by the communication terminal, to judge whether or not the delay time of the $2^{nd}$-type data is less than the allowable delay value for each of the frames included in the first channels, in the case where the $2^{nd}$-type data is transmitted during the preferential data period associated with the frame, and select, as the target channel, the first channel to which a smaller number of the communication terminals are assigned from among the first channels including the frames judged to include the delay time less than the allowable delay value.

With this configuration, the selecting unit determines the active period to be shortened to transmit the $2^{nd}$-type data on the basis of the number of associated terminals for each channel and the allowable delay value set to the $2^{nd}$-type data. As a result, the $2^{nd}$-type type data can be transmitted/received so as to satisfy the allowable delay value set to the $2^{nd}$-type data while minimizing the effect on transmission/reception of the $1^{st}$-type data.

A communication terminal according to an aspect of the present invention is a communication terminal in a wireless communication system that wirelessly communicates $1^{st}$-type data between a controller and a communication terminal during an active period included in a frame that is repetitive unit time, the communication terminal comprising: a receiving unit configured to receive a broadcasting signal including information corresponding to a length of the active period in the frame from the controller; and a control unit configured to cause the receiving unit to receive the data during a preferential data period predetermined for each frame that is a period during which the communication terminal is to receive the data, in the case where the active period corresponding to the received broadcasting signal and the preferential data period do not overlap with each other in the same frame.

With this configuration, in the case where the predetermined preferential data period and the active period do not overlap with each other, the receiving unit of the communication terminal waits for the possible $2^{nd}$-type data transmitted from the controller during at least a part of the preferential data period. As a result, in the case where the controller transmits the $2^{nd}$-type data, the probability that the $1^{st}$-type data transmitted from the communication terminal collides with the $2^{nd}$-type data is decreased. Therefore, in the case where the communication terminal receives the $2^{nd}$-type data, delay can be reduced.

For example, the communication terminal may further include a channel setting unit configured to divide in a frequency domain a communication channel of the wireless communication into a first channel for wirelessly communicating the $1^{st}$-type data, the first channel including a plurality of frames as repetitive unit time in the wireless communication using the channel, and a second channel for receiving $2^{nd}$-type data that is different from the $1^{st}$-type data, to set a frequency used by the receiving unit to the first channel during the active period, and to set the frequency used by the receiving unit to the second channel during the preferential data period that does not overlap with the active period in the same frame.

With this configuration, in the case where the preferential data period and the active period do not overlap with each other, the receiving unit of the communication terminal waits for the possible $2^{nd}$-type data transmitted from the controller in the second channel dedicated to transmit and receive the $2^{nd}$-type data for each preferential data period. As a result, even in the case where the communication channel is divided into a plurality of channels, irrespective of the number of the channels, the $2^{nd}$-type data can be transmitted/received with less delay time.

A wireless communication system according to an aspect of the present invention includes a controller and a communication terminal.

With this configuration, in the case where the controller transmits the $2^{nd}$-type data, it is possible to decrease the probability that the $2^{nd}$-type data collides with the $1^{st}$-type data, thereby generating delay of the $2^{nd}$-type data in wireless communication between the controller and the communication terminal.

These general or specific modes may be implemented by a system, a method, an integrated circuit, a computer program, or a recording medium such as a computer-readable CD-ROM, or may be implemented by any combination of the system, the method, the integrated circuit, the computer program, and the recording medium.

The controller from an aspect of the present invention will be described below in more detail with reference to figures.

The below-mentioned embodiments each show one specific example of the present invention. Numeric values, shape, materials, constituents, arrangement and connection of the constituents, steps, and the order of steps in the below-mentioned embodiments are merely examples, and do not intend to limit the present invention. Among the components in the following embodiments, constituents that are not recited in independent claims defining the highest concept are described as optional constituents.

Embodiment 1

First, the configuration of a controller in accordance with Embodiment 1 of the present invention will be described.

Figure 1:
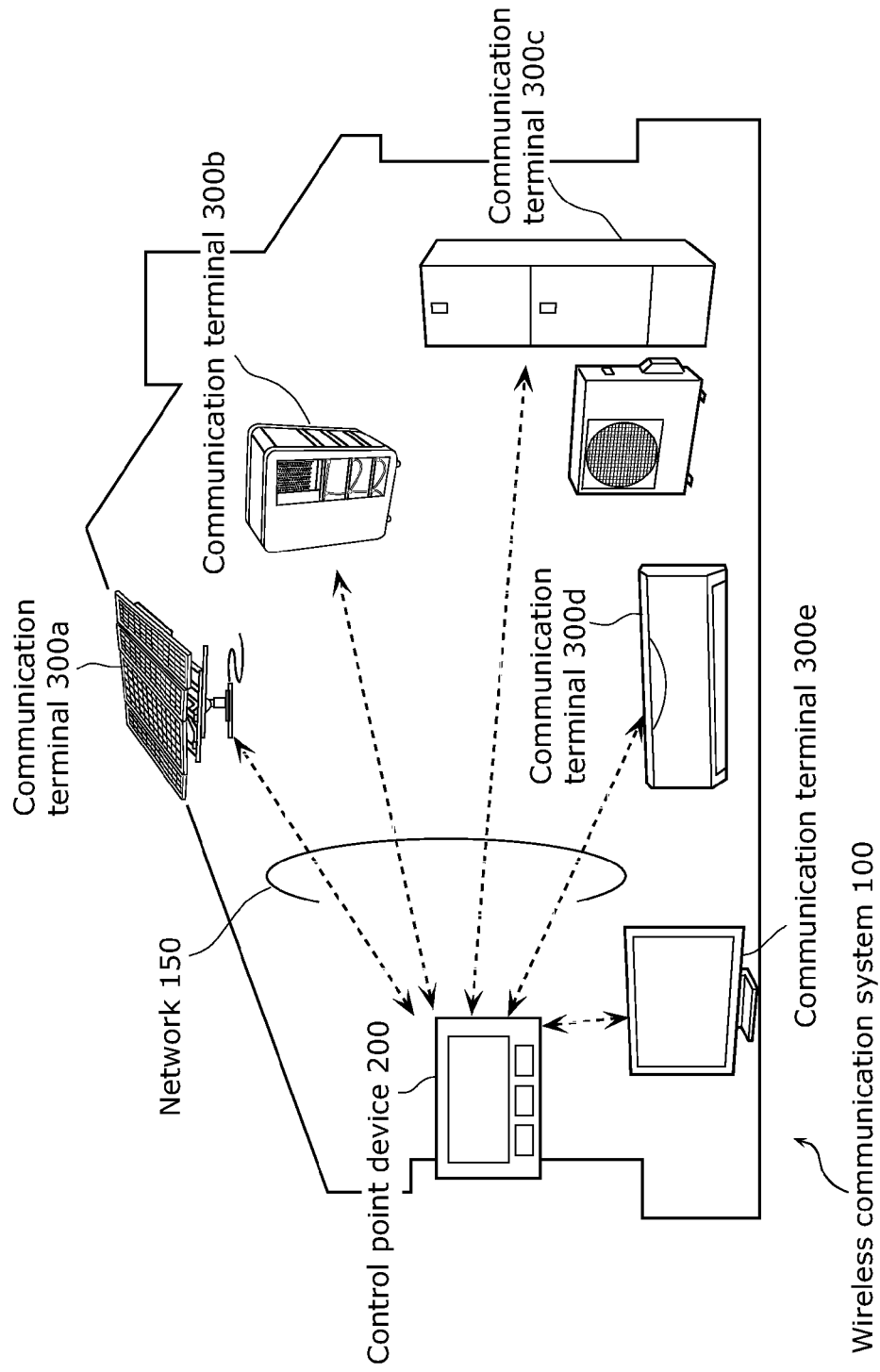
FIG. 1 is a view showing an example of the configuration of a wireless communication system in accordance with Embodiment 1.

FIG. 1 is a view showing an example of the configuration of a wireless communication system in this embodiment.

As shown in FIG. 1, a wireless communication system 100 has a control point device 200 and communication terminals 300a to 300e. Hereinafter, the communication terminals 300a to 300e may be collectively referred to as communication terminals 300. The control point device 200 is also referred to as a controller. The control point device 200 is connected to the communication terminals 300 via a network 150. The network 150 is, for example, a wireless network that complies with the IEEE802.15 standard.

The control point device 200 regularly acquires, for example, data on power consumed or generated by each of the communication terminals 300. More specifically, the control point device 200 acquires data on power generated by photovoltaic power generation from the communication terminal 300a as a photovoltaic power generation system. The control point device 200 acquires data on a charged/discharged amount of a storage battery from the communication terminals 300b as a power supply. The control point device 200 acquires power consumed by each of the communication terminals 300c to 300e from the communication terminals 300c to 300e as home electronic appliances.

Reduction of delay is not demanded so much in communication of such data on power consumption and the like. A type of the data that does not require reduction of delay is hereinafter referred to as $1^{st}$-type data or normal data.

Meanwhile, based on the information acquired from each of the communication terminals 300, the control point device 200 performs peak cut control of, for example, the home electric appliances. The control signal transmitted from the control point device 200 to the communication terminals 300 for peak cut control is a control signal of type that highly requires reduction of delay. This type of data that requires further reduction of delay than the normal data is hereinafter referred to as $2^{nd}$-type data or preferential data.

In the wireless communication system 100, wireless communication of the normal data and the preferential data between the control point device 200 and the communication terminals 300 is repeated.

Next, referring to FIG. 2, repetitive unit time of such wireless communication will be described in detail.

Figure 2:
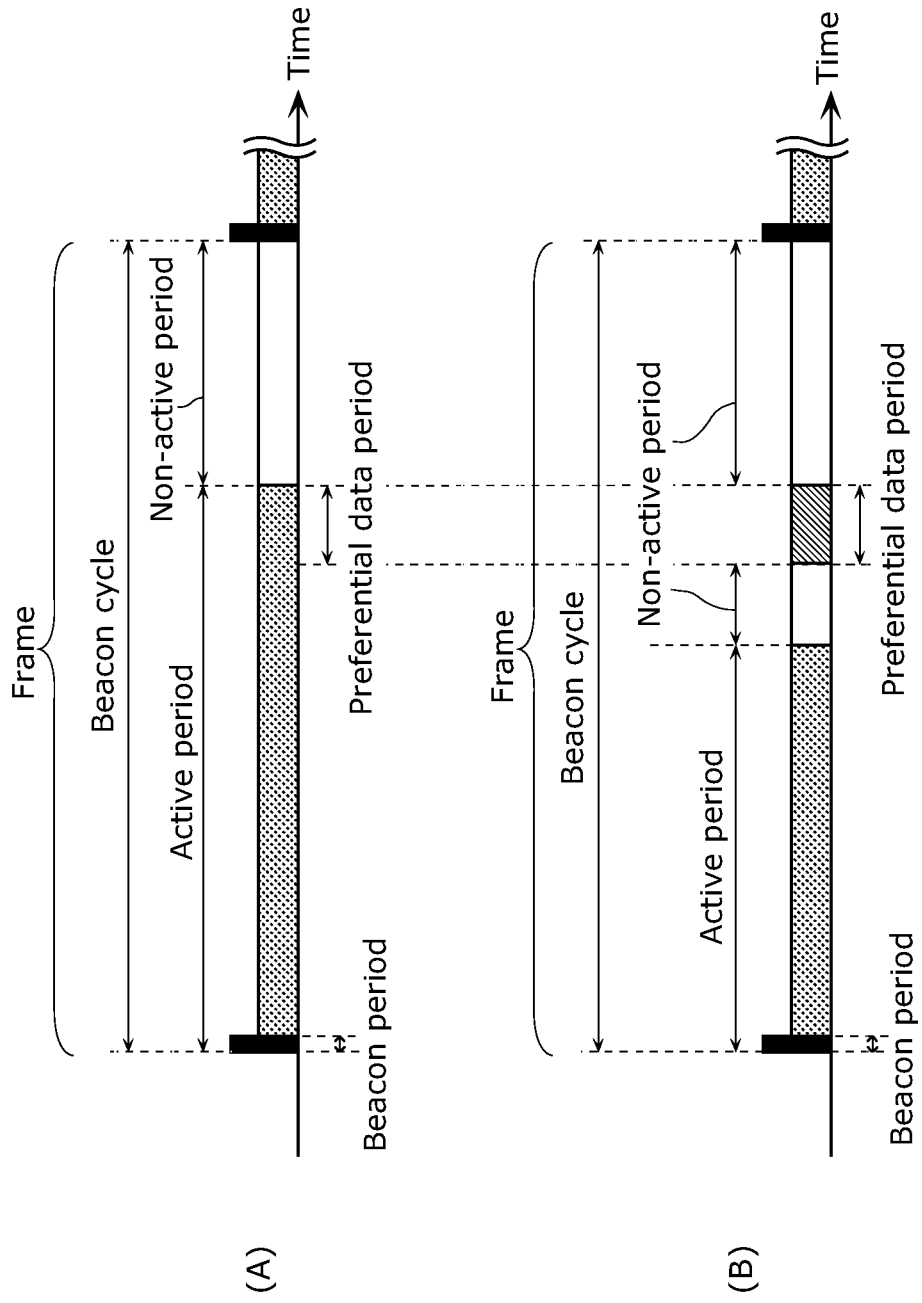
FIG. 2 is a view showing details of a frame that is repetitive unit time of wireless communication between a control point device and a communication terminal in accordance with Embodiments 1 and 2.

FIG. 2 is a view showing details of a frame that is the repetitive unit time of wireless communication between the control point device 200 and the communication terminals 300 in accordance with this embodiment.

Referring to (A) of FIG. 2, each frame includes five types of periods. The periods are a beacon cycle, a beacon period, an active period, a non-active period, and a preferential data period.

The beacon cycle has a length of one frame. Since the frame is divided according to a broadcasting signal (hereinafter also referred to as beacon) broadcasted from the control point device 200 to the communication terminals 300, a time from reception of a beacon to reception of a next beacon is the beacon cycle. The beacon includes information corresponding to the beacon period when the next beacon is transmitted. Accordingly, the communication terminals 300 can recognize the beacon cycle in each frame from the information included in the beacon.

The beacon period is a period when the beacon is transmitted. During the beacon period, all of the communication terminals 300 are in a reception state.

The active period is a period when the normal data is transmitted/received between the control point device 200 and the communication terminals 300. For example, when the beacon includes information indicating the length of the active period in the frame starting from the beacon, the communication terminals 300 can acquire the length of the active period in each frame.

The non-active period is a period other than the beacon period, the active period, and the below-mentioned preferential data period in the beacon cycle. Specifically, it is a period when wireless communication between the control point device 200 and the communication terminals 300 is not performed. Accordingly, the control point device 200 and the communication terminals 300 may turn off the communication function in the non-active period.

The preferential data period is a period when the preferential data is transmitted from the control point device 200 to the communication terminals 300. In the preferential data period, all of the communication terminals 300 always execute reception processing. In the preferential data period, it is preferred that the communication terminals 300 are in the reception state for a predetermined period or longer. With this configuration, the number of the communication devices that transmit data in the referential data period is decreased. For this reason, when the control point device 200 transmits a packet including the preferential data, the probability that a packet transmitted from the communication terminals 300 collides with a packet including the preferential data is decreased. Accordingly, delay in the wireless communication of the preferential data can be reduced. More preferably, during the preferential data period, all of the communication terminals 300 may be in the reception state at all times. Since the communication device that transmits the packet colliding with the packet transmitted from the control point device 200 does not exist, delay can be reduced more reliably.

In this embodiment, the preferential data period is previously determined between the control point device 200 and the communication terminals 300. However, by including information indicating the preferential data period in the beacon and transmitting the information from the control point device 200 to the communication terminals 300, the information may be shared by the control point device 200 and the communication terminals 300.

As shown in (A) of FIG. 2, the active period and the non-active period are set in the beacon cycle. However, there is no exclusive relationship between each of the beacon period and the preferential data period, and the active period and the non-active period. For example, in this embodiment, the beacon period is included in the active period. However, any of the active period and the non-active period in the frame may precede. Accordingly, in the case where the non-active period precedes the active period in the frame, the beacon period is included in the non-active period.

The preferential data period overlaps with at least either the active period or the non-active period. (A) of FIG. 2 shows the case where the preferential data period overlaps with the active period. (B) of FIG. 2 shows the case where the preferential data period does not overlap the active period. In this embodiment, according to the communication standard, in the case where the preferential data period and the active period overlap with each other, the control point device 200 and the communication terminals 300 manage the overlapping period as the active period. Accordingly, in the case shown in (A) of FIG. 2, the communication terminals 300 do not need to receive data in the preferential data period. In the case where the preferential data period and the non-active period overlap with each other, the control point device 200 and the communication terminals 300 manage the overlapping period as the preferential data period. Accordingly, in the case shown in (B) of FIG. 2, the communication terminals 300 need to receive data in the preferential data period.

Next, referring to FIG. 3, the configuration of the control point device that performs wireless communication in units of the frame will be described.

Figure 3:
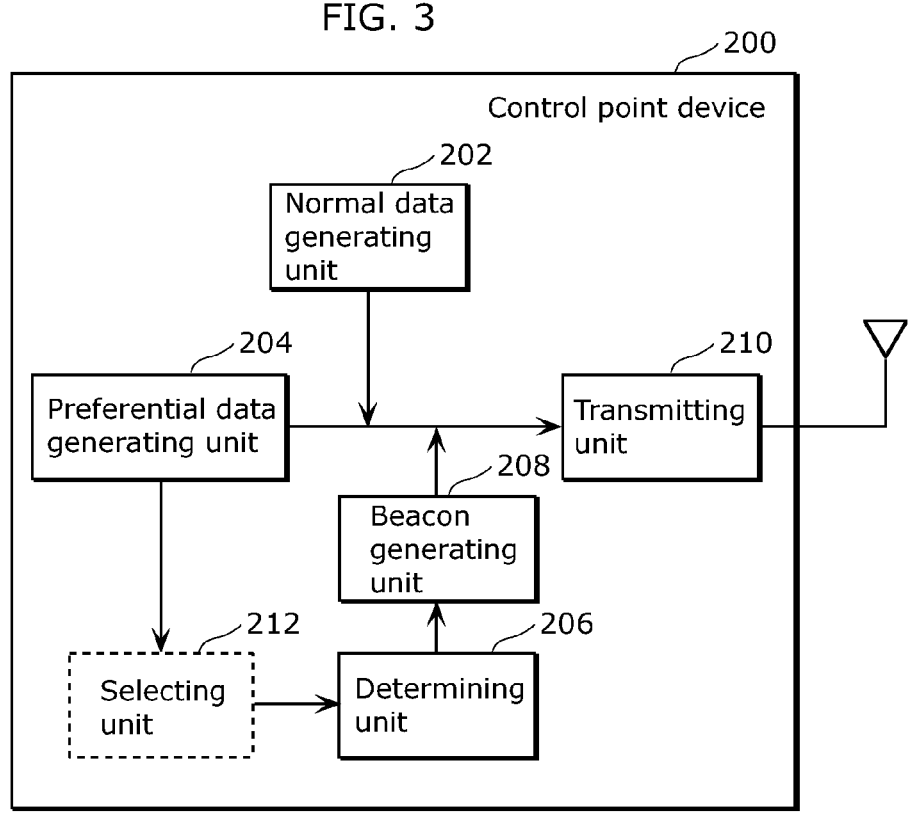
FIG. 3 is a view showing the configuration of functional blocks in the control point device in accordance with Embodiment 1.

FIG. 3 is a view showing functional blocks in the control point device 200 in accordance with this embodiment.

As shown in FIG. 3, the control point device 200 in accordance with this embodiment includes a normal data generating unit 202, a preferential data generating unit 204, a determining unit 206, a beacon generating unit 208, a transmitting unit 210, and a selecting unit 212. The beacon generating unit 208 corresponds to a signal generating unit.

The control point device 200 is a control point device in the wireless communication system 100 that wirelessly communicates the $1^{st}$-type data between the control point device 200 and the communication terminals 300 in the active period included in the frame that is the repetitive unit time.

The normal data generating unit 202 generates the $1^{st}$-type data. For example, referring to FIG. 1 again, to present a history of information on electricity generated for past one month, which is acquired from the communication terminal 300a, to the user, the normal data generating unit 202 generates data to be transmitted to the communication terminal 300e as a television.

The preferential data generating unit 204 generates the $2^{nd}$-type type data that is different from the $1^{st}$-type data. For example, when receiving an instruction of peak cut from a distribution switch board (not shown) connected to the control point device 200 in a wired manner, the preferential data generating unit 204 generates a control signal or the like for forcedly decreasing the output of the communication terminal 300d as an air conditioner, as the $2^{nd}$-type data.

The determining unit 206 determines the length of the active period in each frame. Describing in more detail, in the case where the preferential data generating unit 204 generates the $2^{nd}$-type data, the determining unit 206 shortens the length of the active period from a predetermined value such that (1) the active period and (2) the preferential data period that is a period previously determined in each frame that is a period when the communication terminals 300 need to receive data, as well as a period when the control point device 200 transmits the $2^{nd}$-type data do not overlap with each other in the same frame, and determines the shortened length as the length of the active period. More preferably, the determining unit 206 may shorten the length of the active period from a predetermined value such that the non-active period of a predetermined time or longer is included before the preferential data period included in the same frame, and determine the shortened length as the length of the active period.

In the case where the normal data generating unit 202 generates the $1^{st}$-type data, the determining unit 206 determines the length of the active period to be, for example, a predetermined value of the length of the active period.

The beacon generating unit 208 generates the beacon that is a broadcasting signal including information on the determined length of the active period. The information generated by the beacon generating unit 208 may include, in addition to the length of the active period, the beacon period when a next beacon is transmitted, a start time of the active period, and so on. The information may include information indicating the preferential data period.

The transmitting unit 210 is a communication interface that transmits the beacon in each frame. Describing in more detail, the transmitting unit 210 transmits the $1^{st}$-type data during the active period. The transmitting unit 210 transmits a first beacon that is a beacon including information corresponding to the shortened length of the active period, which is determined by the determining unit 206. The transmitting unit 210 further transmits the $2^{nd}$-type data during the preferential data period included in a frame following the frame in which the first beacon is transmitted.

More preferably, the transmitting unit 210 may transmit the first beacon in a frame following the frame in which the $2^{nd}$-type data is generated. After that, the transmitting unit 210 may transmit the $2^{nd}$-type data during the preferential data period included in the same frame that is the frame in which the first beacon is transmitted.

As a specific implementation of the transmitting unit 210, any communication interface may be used as long as it is a wireless communication interface. For example, a communication interface according to the IEEE802.15.4 and a communication interface for wireless LAN are available. In this embodiment, the beacon is transmitted by broadcasting to all of the communication terminals 300.

The selecting unit 212 selects a frame in which the preferential data is to be transmitted from among a plurality of frames. For example, in the case where the intensity of an electric wave in wireless communication with the communication terminals 300 temporarily becomes weak, only when there is a sufficient delay time allowable for the generated preferential data, the frame in which the preferential data is transmitted may be delayed. In the case where a plurality of pieces of preferential data is generated, the frame may be selected so as to transmit the preferential data having a shorter allowable delay time earlier.

The wireless communication system 100 is not necessarily provided with the selecting unit 212. For example, the wireless communication system 100 can achieve the same effect by transmitting the preferential data as soon as possible.

Next, referring to FIG. 4, the configuration of the communication terminals 300 in accordance with the embodiment of the present invention will be described.

Figure 4:
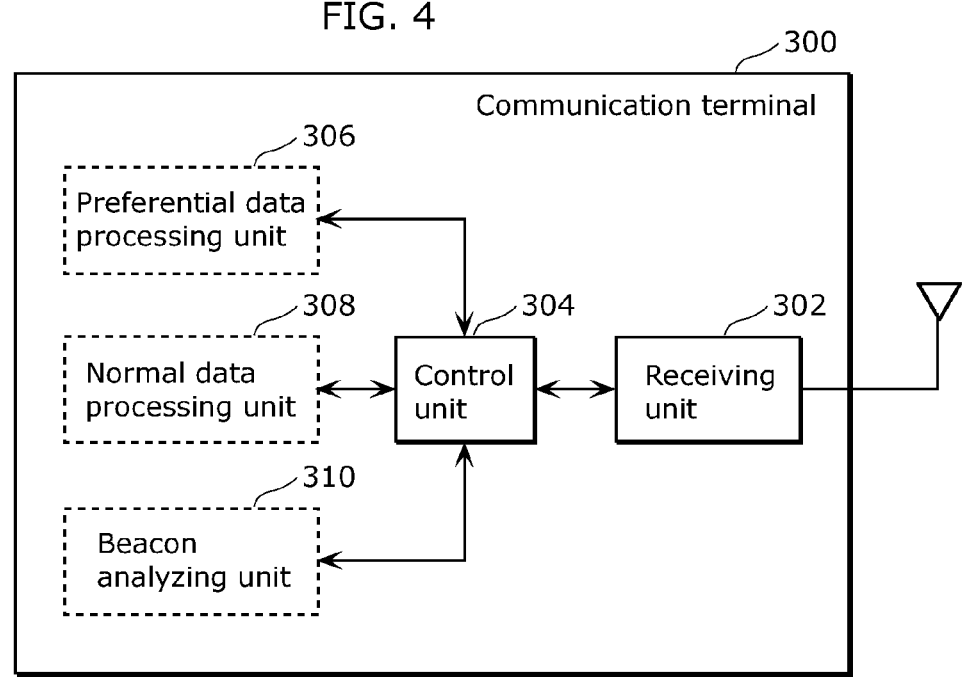
FIG. 4 is a view showing the configuration of functional blocks in the communication terminal in accordance with Embodiment 1.

FIG. 4 is a view showing the configuration of functional blocks in the communication terminal 300 in accordance with this embodiment.

As shown in FIG. 4, the communication terminals 300 each include a receiving unit 302, a control unit 304, a preferential data processing unit 306, a normal data processing unit 308, and a beacon analyzing unit 310.

The communication terminals 300 are communication terminals in the wireless communication system 100 that performs wireless communication of the $1^{st}$-type data between the control point device 200 and the communication terminals 300 during the active period included in the frame having a plurality of periods.

The receiving unit 302 is a communication interface that receives the beacon from the control point device 200. Specifically, the receiving unit 302 may use the same communication interface as that of the transmitting unit 210 of the control point device 200.

In the case where the active period corresponding to the received beacon, and the preferential data period that is the period previously determined in each frame that is the period when the communication terminals 300 need to receive data do not overlap with each other in the same frame, the control unit 304 causes the receiving unit 302 to receive data during the preferential data period. More preferably, the control unit 304 brings the receiving unit 302 into the reception state at all times during the preferential data period.

The preferential data processing unit 306 executes processing according to an instruction indicated by the received preferential data. For example, in the case where the preferential data is the above-mentioned control signal for peak cut control, the preferential data processing unit 306 executes processing of decreasing power consumed by the communication terminals 300.

The normal data processing unit 308 executes processing according to an instruction indicated by the received normal data. For example, in the case where the normal data is a command to instruct the normal data processing unit 308 to transmit power consumption of the communication terminals 300 to the control point device 200, the normal data processing unit 308 acquires power consumption during a predetermined period and transmits the acquired power consumption to the control point device 200.

The beacon analyzing unit 310 analyzes information included in the beacon, thereby acquiring a length of the beacon cycle, a termination time of the active period, and so on, for each frame.

The communication terminals 300 each are not necessarily provided with the preferential data processing unit 306, the normal data processing unit 308, and the beacon analyzing unit 310.

For example, a data processor (not shown) as an external device of the communication terminals 300 may process the preferential data. Similarly, the data processor (not shown) as an external device of the communication terminals 300 may process the normal data. An analyzer (not shown) as an external device of the communication terminals 300 may analyze the beacon, and transmit its result to the communication terminals 300.

Accordingly, even the communication terminals 300 including no preferential data processing unit 306, normal data processing unit 308, and beacon analyzing unit 310 can achieve the same effect.

Next, processing of transmitting the preferential data will be summarized.

Figure 5:
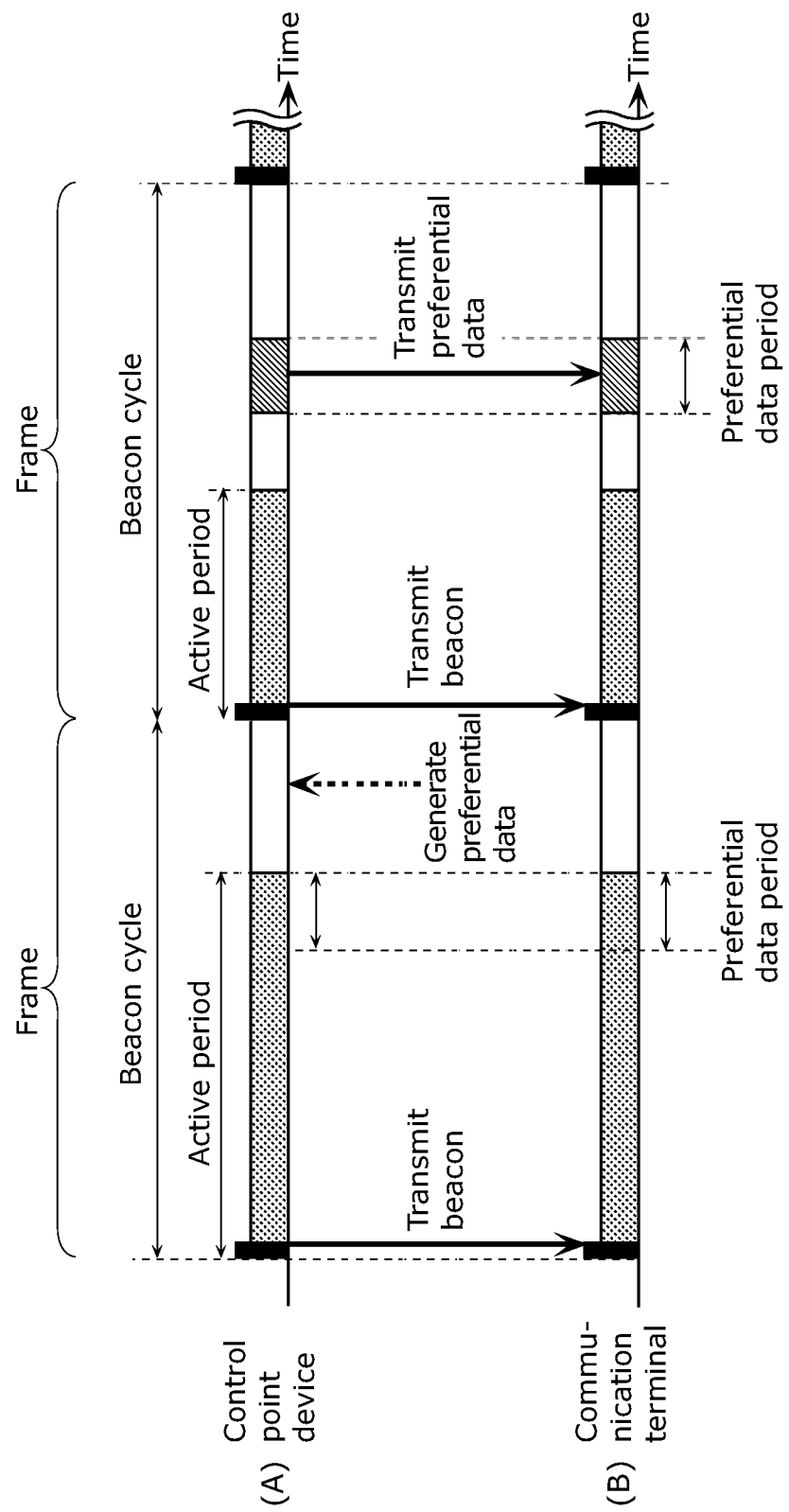
FIG. 5 is a view showing the configuration of periods included in a frame in the case where preferential data is transmitted from the control point device to the communication terminal in accordance with Embodiment 1.

FIG. 5 shows the configuration of periods included in the frame in the case where the preferential data is transmitted from the control point device 200 to the communication terminals 300 in accordance with this embodiment. For convenience of description, for each of the control point device 200 and the communication terminal 300, out of two frames shown in FIG. 5, a left frame is referred to as a first frame, and a right frame is referred to as a second frame.

First, as shown in (A) of FIG. 5, it is assumed that the control point device 200 generates the preferential data at the end of the first frame. As described above, since the allowable delay value is set to the preferential data, the preferential data needs to be transmitted during the preferential data period that is unlikely to cause the collision between packets. However, in the first frame, the active period in synchronism between the control point device 200 and the communication terminal 300 completely overlaps with the preferential data period. Since the communication terminals 300 can turn off their communication functions even during the preferential data period, the first frame shown in (A) and (B) of FIG. 5 can advantageously perform the power-saving performance.

The control point device 200 determines the active period of the second frame to be shorter than the active period of the first frame such that the active period of the second frame does not overlap with the preferential data period. After that, the beacon designating the determined length of the active period is transmitted at start of the second frame. As a result, both of the active period of the second frame of the control point device 200 shown in (A) of FIG. 5 and the active period of the second frame of the communication terminal 300 shown in (B) of FIG. 5 are shorter the active period of the first frame. Thus, in the second frame, the preferential data period and the active period do not overlap with each other. As a result, the preferential data period that has been overlapped with the active period appears.

The second frame shown in (A) and (B) of FIG. 5 can advantageously reduce delay in communication by transmitting the preferential data from the control point device 200 during the appeared preferential data period. Moreover, since the communication function can be turned off during a period other than the active period and the preferential data period, the power-saving performance can be achieved.

The control point device 200 and the communication terminals 300 in accordance with this embodiment can dynamically use the first frame and the second frame shown in (A) and (B) of FIG. 5 for different purposes, thereby achieving both the power-saving performance and reduction of delay in communication.

Next, flow of processing executed by the control point device 200 will be described.

Figure 6:
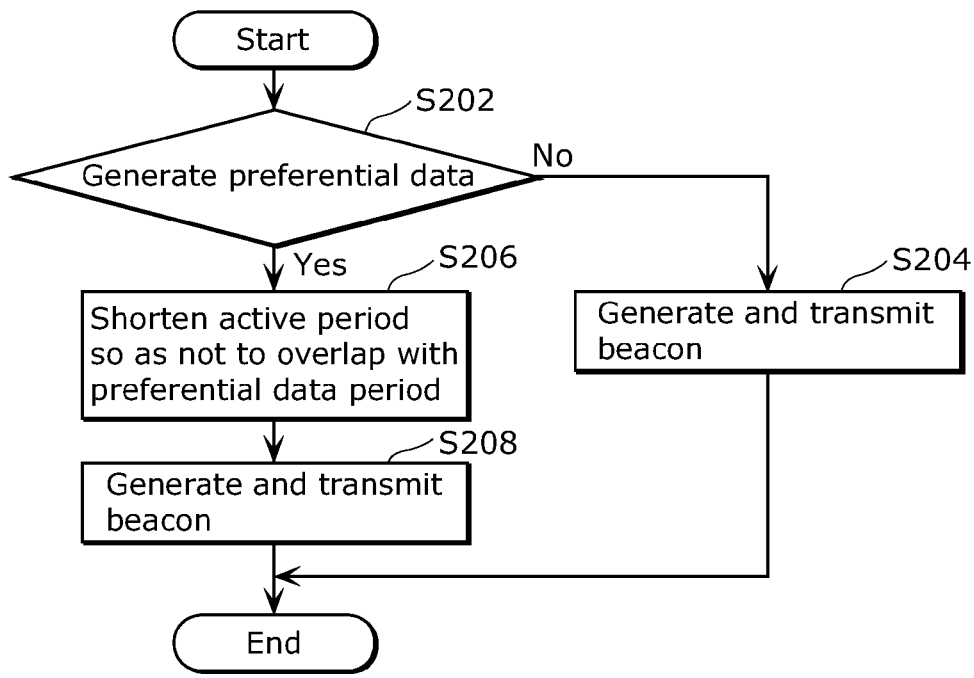
FIG. 6 is a flow chart showing an example of flow of processing executed by the control point device in accordance with Embodiment 1.

FIG. 6 is a flow chart showing flow of the processing executed by the control point device 200 in accordance with this embodiment.

First, the preferential data generating unit 204 judges whether or not the preferential data to be generated is present (S202). In the case where it is judged that the preferential data to be generated is not present (No in S202), the beacon generating unit 208 generates a beacon including the active period having a predetermined length. After that, the transmitting unit 210 transmits the generated beacon (S204).

In the case where it is judged that the preferential data to generated is present (Yes in S202), the preferential data generating unit 204 generates the preferential data. After that, the determining unit 206 shortens the length of the active period such that the active period does not overlap with the preferential data period (S206).

Next, the beacon generating unit 208 generates a beacon designating the determined length of the active period. Then, the transmitting unit 210 transmits the generated beacon (S208).

It is preferred that the control point device 200 makes sure to transmit the generated preferential data during the preferential data period. Even when some of the preferential data is transmitted during the preferential data period and remaining preferential data is transmitted during the active period, as compared to the case where the entire preferential data is transmitted during the active period, delay can be reduced. However, by making sure to transmit the generated preferential data during the preferential data period, delay can be further reduced. Flow of processing executed by the control point device 200 in this case will be described with reference to FIG. 7.

Figure 7:
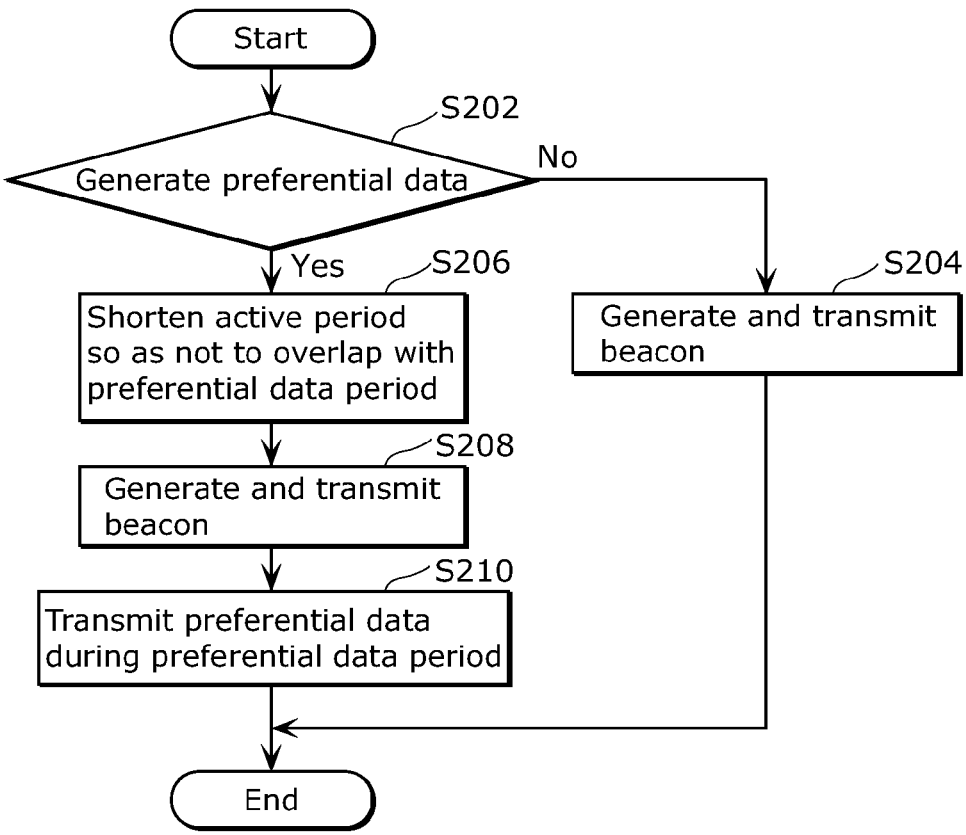
FIG. 7 is a flow chart showing another example of the flow of the processing executed by the control point device in accordance with Embodiment 1.

FIG. 7 is a second flow chart showing the flow of the processing executed by the control point device 200 in accordance with this embodiment. The same steps as those in FIG. 6 are given the same reference numerals, and detailed description thereof is omitted.

In Step S210 in FIG. 7, the transmitting unit 210 transmits the generated preferential data during the preferential data period after shortening of the active period. Describing in more detail, it is preferred that the transmitting unit 210 transmits the preferential data during the preferential data period included in the same frame that is the frame having the shortened active period. Thereby, reduction of delay at transmission of the preferential data can be achieved more reliably.

Next, referring to FIG. 8, the power-saving performance of the wireless communication system 100 will be described in more detail.

Figure 8:
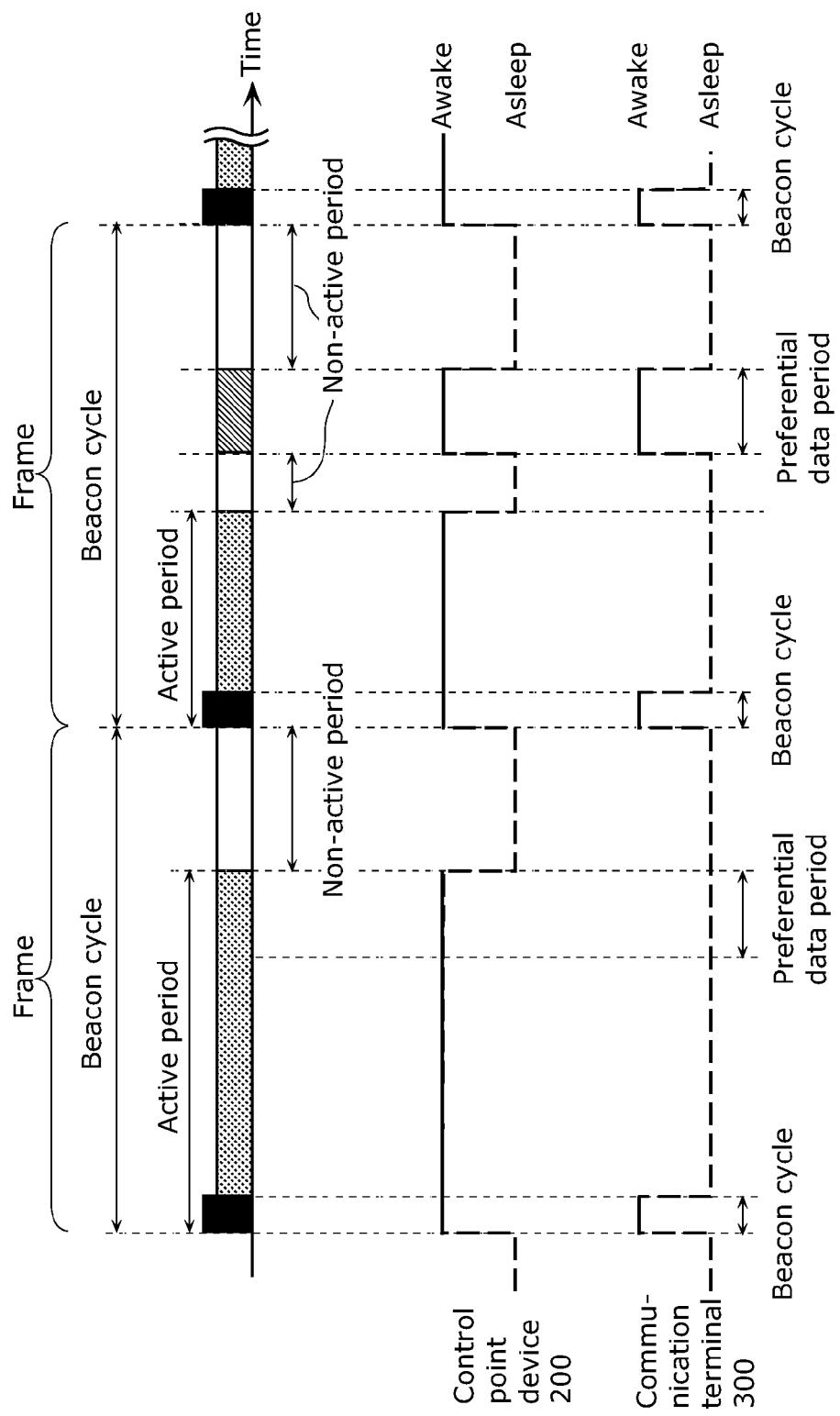
FIG. 8 is a view showing a power feeding state to wireless communication functions of the control point device and the communication terminal in accordance with Embodiment 1.

FIG. 8 is a view showing an example of a power feeding state to wireless communication functions of the control point device 200 and the communication terminals 300 in accordance with this embodiment. FIG. 8 shows two states: awake and asleep for each of the control point device 200 and the communication terminals 300. The waking state refers to a state where the wireless communication function is turned on. The sleeping state refers to a state where the wireless communication function is turned off.

When judging that wireless communication is required, the control point device 200 and the communication terminals 300 each turn off the respective wireless communication functions to be put into the waking state. For example, during the beacon period, to transmit the beacon, the control point device 200 turns on the wireless communication function to be put into the waking state. During the beacon period, to receive the beacon, the communication terminals 300 turn on their wireless communication functions to be put into the waking state.

On the contrary, when judging that wireless communication is not required, the control point device 200 and the communication terminals 300 each turn off the respective wireless communication functions to be put into the sleeping state. For example, the communication terminal 300, which recognizes transmission of the normal data thereto on the basis of information included in the beacon, turns on the wireless communication function to be put into the waking state. However, the other communication terminals 300 can turn off their wireless communication functions to be put into the sleeping state. While communication is not scheduled, for example, during the non-active period, the control point device 200 can turn off the wireless communication function to be put into the sleeping state. That is, during the period when the control point device 200 and the communication terminals 300 that does not perform wireless communication may turn off the respective wireless communication functions, the control point device 200 and the communication terminals 300 can be put into the sleeping state. Even when wireless communication is not required, each of the control point device 200 and the communication terminals 300 does not necessarily turn off the respective wireless communication functions to be put into the sleeping state. FIG. 8 shows an example in which the control point device 200 and the communication terminals 300 are in the sleeping state in periods other than periods when they must be in the waking state.

As shown in FIG. 8, the control point device 200 and the communication terminals 300 are put into the waking state during the beacon period and the preferential data period. The control point device 200 and the communication terminals 300 may be put into the sleeping state during the non-active period.

The control point device 200 is also in the waking state during the active period. This is due to that data may be transmitted from the communication terminals 300 at all times. On the contrary, the communication terminals 300 may be in the sleeping state during the active period. It is due to that, when wireless communication is not required, it is no need to turn on the wireless communication functions. Here, the control point device 200 and the communication terminals 300 judge the period when the preferential data period and the active period overlap with each other to be the active period. Accordingly, during the period when the preferential data period and the active period overlap with each other, the control point device 200 is put into the waking state. On the contrary, the communication terminals 300 may be put into the sleeping state.

By setting the two states: awake and asleep as the power feeding state of the control point device 200 and the communication terminals 300, the control point device 200 and the communication terminals 300 in the wireless communication system 100 can produce the period when the wireless communication functions are turned off. This can achieve the power-saving performance.

As described above, in the case where the preferential data is generated, the control point device 200 in accordance with this embodiment shortens the active period such that the predetermined preferential data period and active period do not overlap with each other. During the preferential data period, except for the control point device 200, the reception processing is required. Accordingly, in the case where the control point device 200 transmits a preferential data packet, the probability that the packet collides with a normal data packet transmitted from the communication terminals 300 is low. Thereby, in the case of transmitting the preferential data, delay can be reduced.

Embodiment 2

Next, a control point device and communication terminals in accordance with Embodiment 2 of the present invention will be described. In this embodiment, a communication channel between the control point device and the communication terminal is divided into a plurality of channels. Examples of a specific method of dividing the communication channel include frequency division, time division, and code division. In following description, frequency division is used. This will be described below in detail with reference to FIG. 9.

Figure 9:
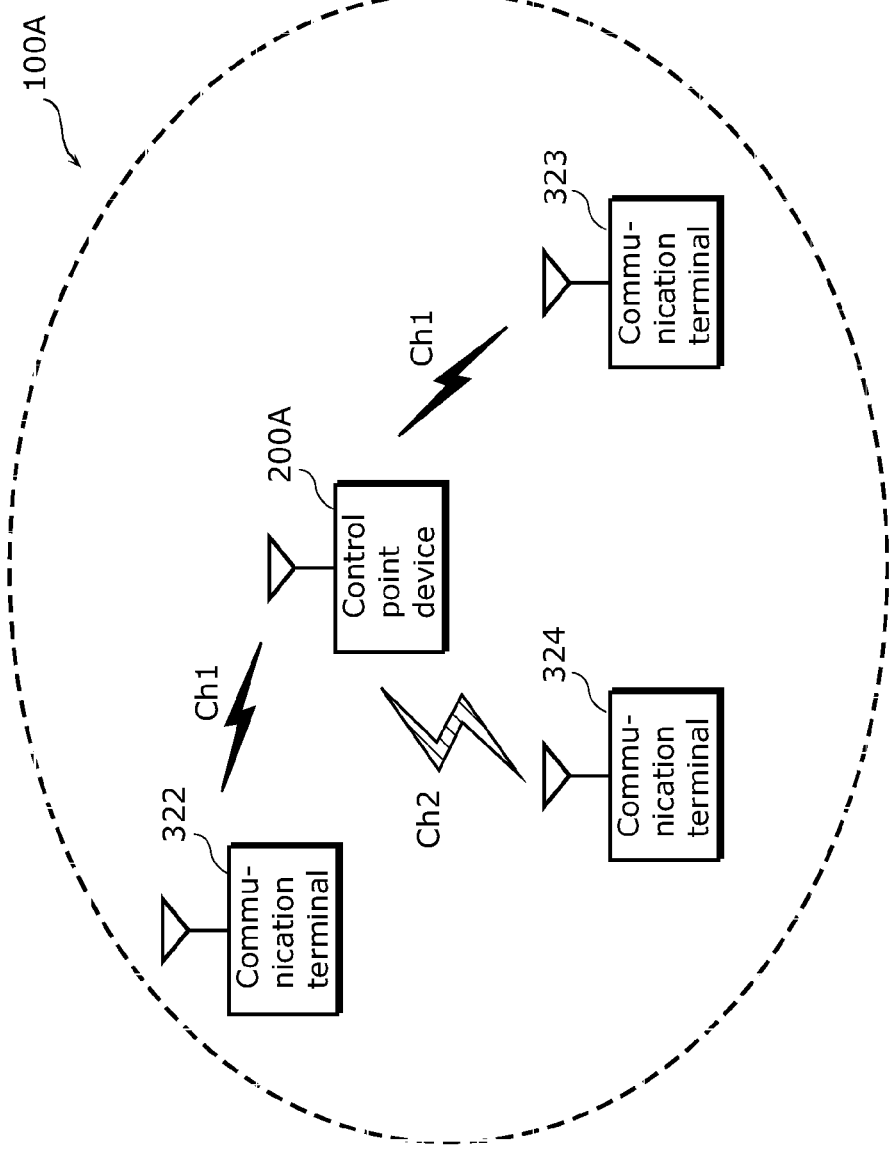
FIG. 9 is a conceptual view showing the configuration of a wireless communication system in accordance with Embodiment 2.

FIG. 9 is a conceptual view showing the configuration of a wireless communication system 100A in accordance with this embodiment.

As shown in FIG. 9, the wireless communication system 100A includes a control point device 200A and communication terminals 322 to 324. Hereinafter, the communication terminals 322 to 324 in accordance with this embodiment will be collectively referred to as communication terminals 300A.

FIG. 9 shows two channels generated by frequency division of the communication channel of the wireless communication. Ch1 is a channel used for communication between the control point device 200 and the communication terminals 322 and 323. Ch1 is a channel used for communication between the control point device 200 and the communication terminal 324.

The control point device 200A in accordance with this embodiment wirelessly communicates with the communication terminal 300A assigned to the corresponding channel while switching the plurality of channels.

Next, referring to FIG. 10, an example of a communication period used for wireless communication performed in each channel will be described.

Figure 10:
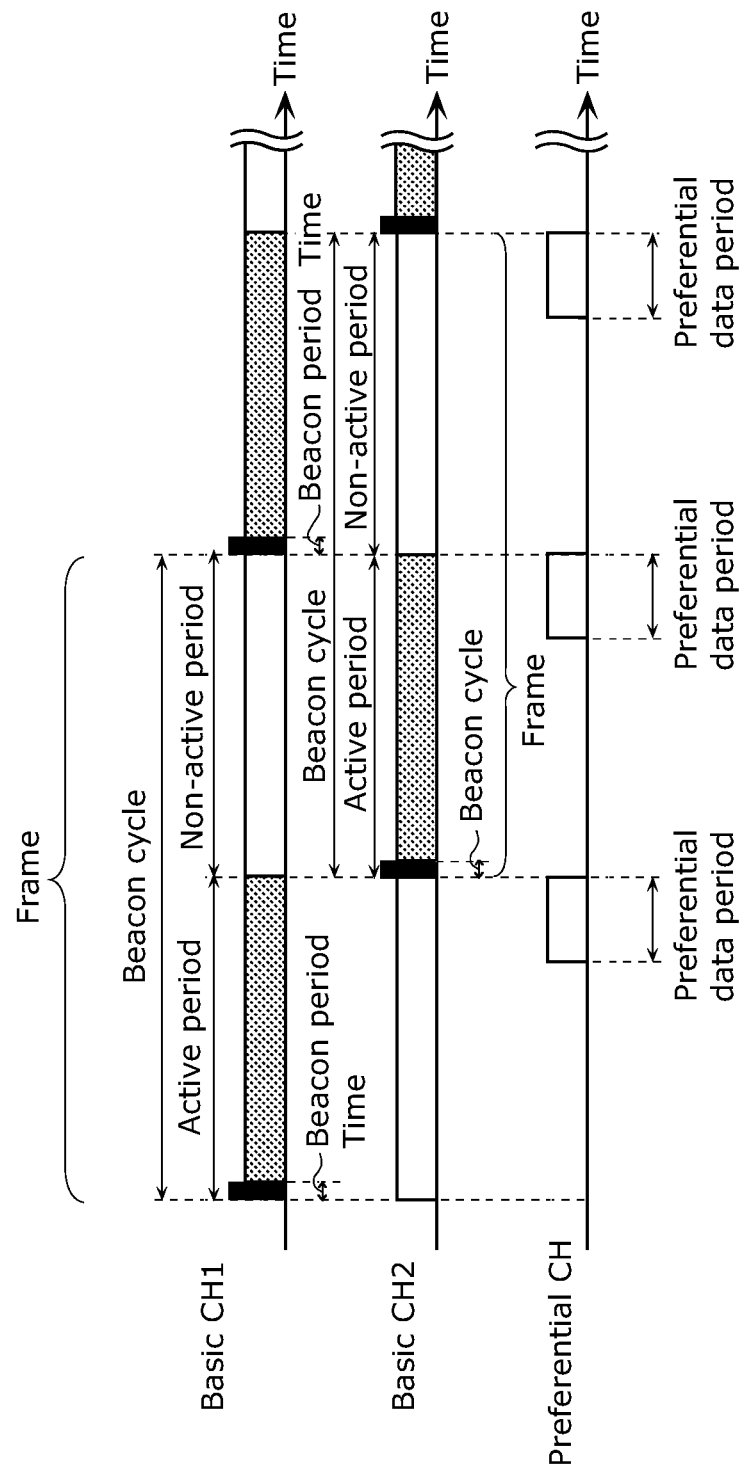
FIG. 10 is a first view showing details of a frame that is repetitive unit time in wireless communication between the control point device and the communication terminal for each channel in accordance with Embodiment 2.

FIG. 10 is a view showing details of a frame that is repetitive unit time in wireless communication between the control point device 200A and the communication terminals 300A for each channel in accordance with this embodiment.

FIG. 10 shows three channels: a basic CH1, a basic CH2, and a preferential CH, which are obtained by dividing the communication channel into a plurality of channels by frequency division. The basic CH1 and the basic CH2 are channels for transmission/reception of the normal data. The preferential CH is a channel for transmission/reception of the preferential data. Specifically, the communication terminals 300A execute the reception processing through the preferential CH during the predetermined preferential data period. Preferably, the communication terminals 300A may continually execute only the reception processing through the preferential CH during the preferential data period.

In this embodiment, at least either the basic CH1 or the basic CH2 is assigned to each of the communication terminals 300A in the wireless communication system 100A. The preferential CH is assigned to all of the communication terminals 300A.

Hereinafter, each of the basic CH1 and the basic CH2 are also referred to as a first channel. The preferential CH is also referred to as a second channel.

As shown in FIG. 10, each of the basic CH1 and the basic CH2 includes a plurality of frames as the repetitive unit time in wireless communication using the channel. The frames are divided by the beacon transmitted through the channel. Each frame includes a beacon cycle, a beacon period, an active period, and a non-active period.

A preferential data period corresponding to each of the frames in the first channels is previously determined. The communication terminals 300A are put into the reception state in the second channel during the preferential data period.

In this embodiment, the first channel is the basic CH1 or the basic CH2. However, more channels may be assigned as the first channels. For example, the communication channel may be divided into three channels: basic CH1 to basic CH3, and each basic channel may be used as the first channel.

Figure 11:
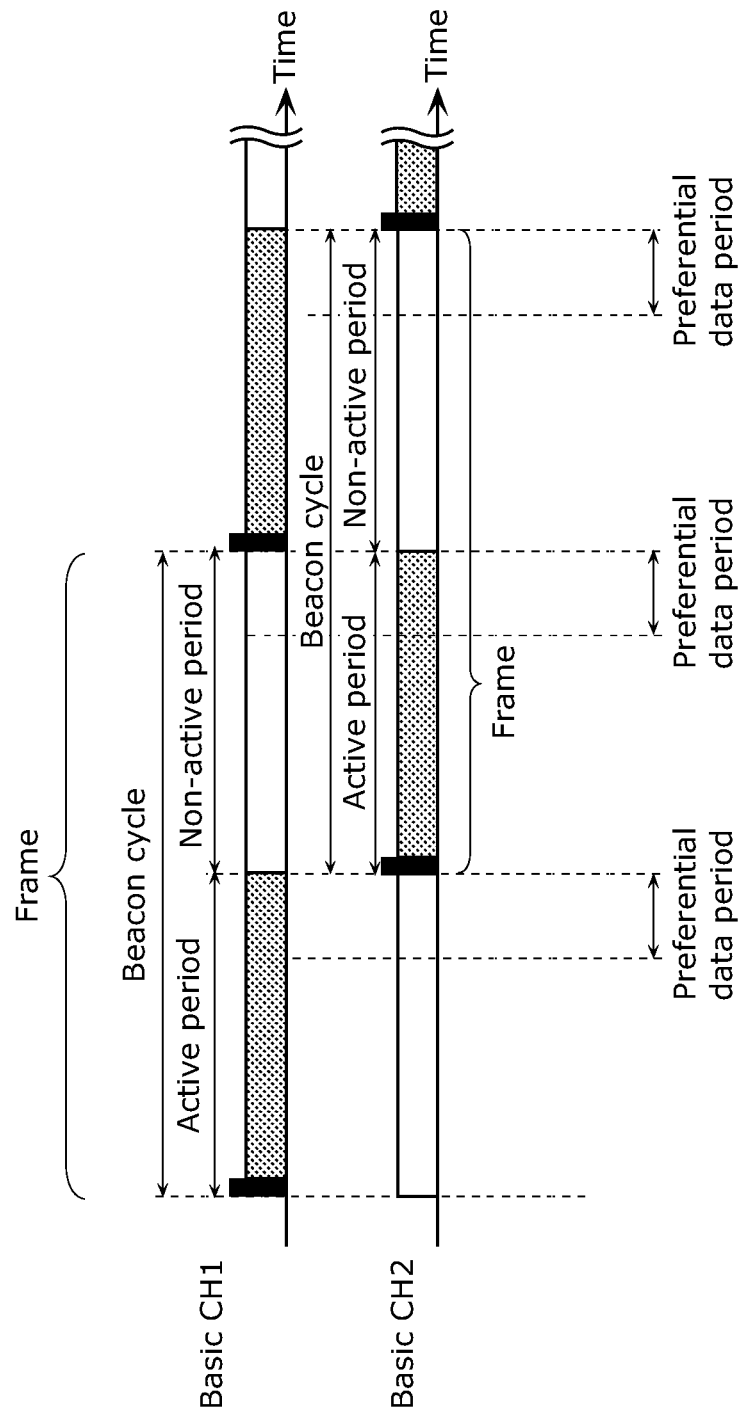
FIG. 11 is a second view showing details of the frame that is the repetitive unit time in wireless communication between the control point device and the communication terminal for each channel in accordance with Embodiment 2.

The preferential CH is not necessarily used. FIG. 11 shows details of the frame for each channel in the case where the preferential CH is not used.

As shown in FIG. 11, the preferential data period is previously determined in each frame included in each of the basic CH1 and the basic CH2. The preferential data is transmitted in each frame included in each of the basic CH1 and the basic CH2 during the corresponding preferential data period. In the case where the preferential CH is not generated, timing at which the preferential data can be transmitted in a certain basic CH is limited to any of subsequent preferential data periods in the same basic CH. Accordingly, by using the preferential CH, the preferential data can be transmitted to all of the communication terminals 300 more rapidly.

Next, referring to FIG. 12, the detailed configuration of the control point device 200A as the control point device in accordance with this embodiment will be described.

Figure 12:
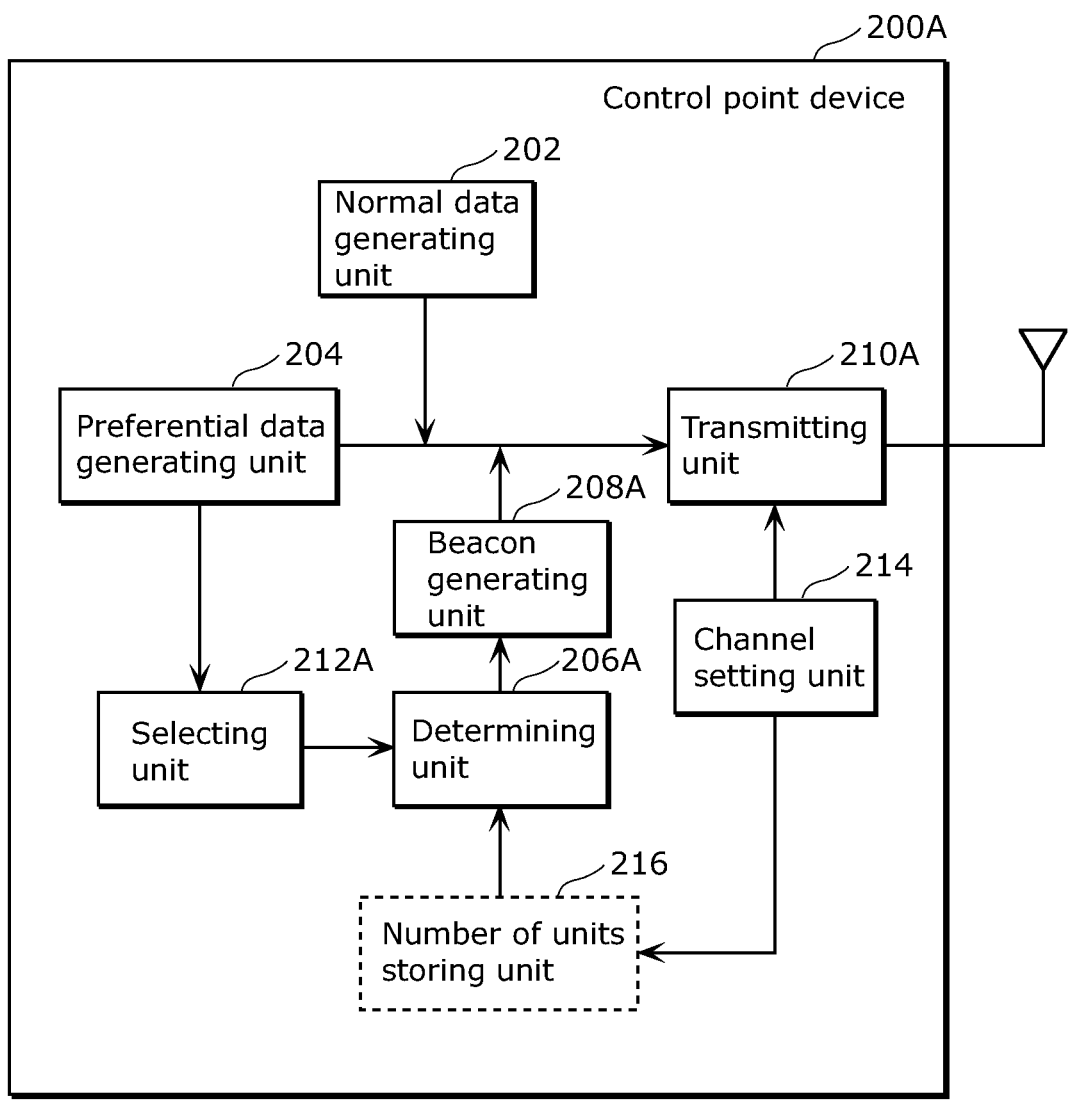
FIG. 12 is a view showing the configuration of functional blocks in the control point device in accordance with Embodiment 2.

FIG. 12 is a view showing the configuration of functional blocks in the control point device 200A in accordance with this embodiment. The same constituents as those of the control point device 200 in accordance with Embodiment 1 in FIG. 3 are given the same reference numerals, and detailed description thereof is omitted.

As shown in FIG. 12, the control point device 200A in accordance with this embodiment includes a normal data generating unit 202, a preferential data generating unit 204, a determining unit 206A, a beacon generating unit 208A, a transmitting unit 210A, a selecting unit 212A, a channel setting unit 214, and a number of units storing unit 216.

The channel setting unit 214 divides in a frequency domain the communication channel in wireless communication into the first channels and the second channel that is different from the first channels and serves to transmit and receive the $2^{nd}$-type data. The channel setting unit 214 further assigns at least one of the first channels and the second channel to each of the plurality of communication terminals. As described above, each of the first channels includes the plurality of frames as the repetitive unit time in wireless communication using the channel. The frames are divided by the beacon. That is, for each channel, a period from a start time of a certain beacon period to a time immediately before the next beacon period constitutes one frame. The preferential data period is previously determined for each of the frames included in the first channels. The communication terminals 300A are put into the reception state in the second channel during the preferential data period.

The selecting unit 212A selects a channel to which the smaller number of communication terminals are assigned from among the first channels, as a target channel.

In the case where the preferential data generating unit generates the $2_{nd}$-type data, the determining unit 206A shortens the length of the active period included in at least one first frame among a plurality of frames included in the target channel from a predetermined length of the active period such that the active period does not overlap with the preferential data period associated with the first frame, and determines the shortened length as the length of the active period.

The beacon generating unit 208A generates the beacon including information corresponding to the length of the active period included in the frame, for each of the frames included in each of the first channels. The beacon generating unit 208A generates a second beacon that is a beacon including information corresponding to the shortened length of the active period determined by the determining unit 206A.

In the case where the channel setting unit 214 assigns the channel to the communication terminal, the beacon generating unit 208A may generate the beacon including an assignment result.

The transmitting unit 210A transmits the second beacon in the first frame. The transmitting unit 210A further transmits the $2^{nd}$-type type data through the second channel during the preferential data period associated with the first frame.

The number of units storing unit 216 is a storing unit for storing the number of communication terminals assigned to each of the first channels. The channel setting unit 214 assigns the first channel to each of the plurality of communication terminals, and stores an assignment result in the number of units storing unit 216. The selecting unit 212A can acquire the number of the communication terminals assigned to the channel by referring to the number of units storing unit 216.

The control point device 200A does not need to include the number of units storing unit 216. For example, the selecting unit 212A can acquire information on the assignment of each channel to the communication terminal directly from the channel setting unit 214 to achieve the same effect.

In the case where the second channel is not used as shown in FIG. 11, the channel setting unit 214 divides the communication channel in wireless communication into the first channels, and assigns at least one of the first channels to each of the plurality of communication terminal. The transmitting unit 210A transmits the second beacon in the first frame. The transmitting unit 210A transmits the $2^{nd}$-type data through the channel including the first frame among the first channels during the preferential data period associated with the first frame.

Next, referring to FIG. 13, the detailed configuration of the communication terminal 300A as the communication terminal in accordance with this embodiment will be described.

Figure 13:
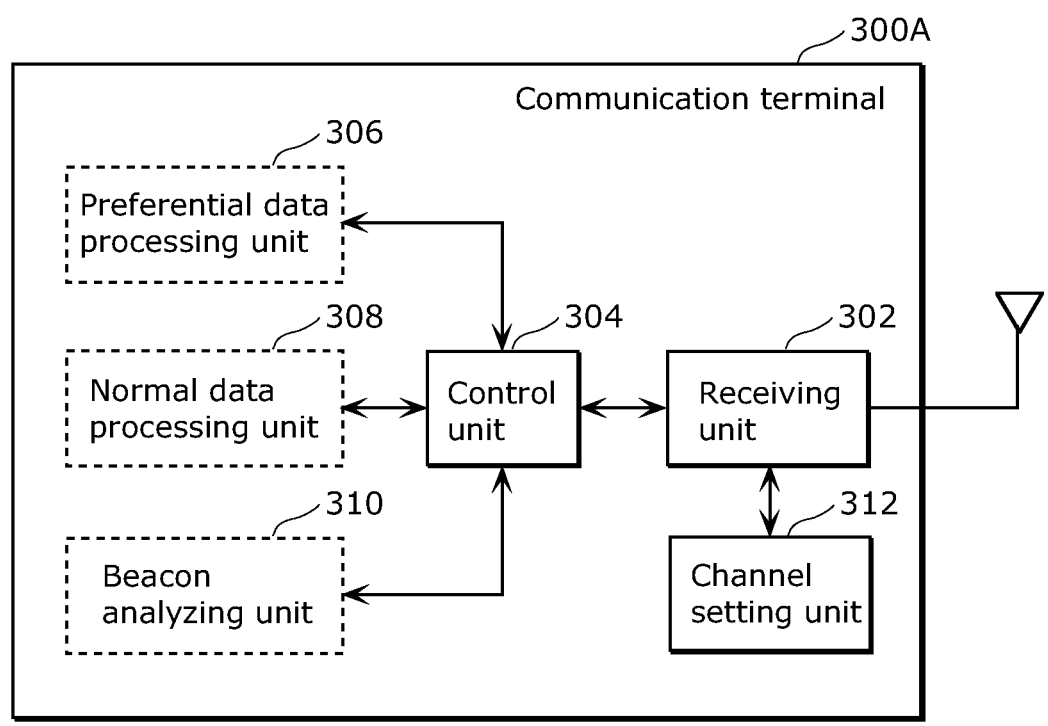
FIG. 13 is a view showing the configuration of functional blocks in the communication terminal in accordance with Embodiment 2.

FIG. 13 is a view showing configurations of functional blocks in the communication terminals 300A in accordance with this embodiment. The same constituents as those in the communication terminal 300 in accordance with Embodiment 1 in FIG. 4 are given the same reference numerals, and detailed description thereof is omitted.

As shown in FIG. 13, the communication terminal 300A includes a receiving unit 302, a control unit 304, a preferential data processing unit 306, a normal data processing unit 308, a beacon analyzing unit 310, and a channel setting unit 312.

The channel setting unit 312 divides in a frequency domain each frame into the first channel for wirelessly communicating the $1^{st}$-type data and the second channel for receiving the $2^{nd}$-type data. The first channel includes the plurality of frames as the repetitive unit time in wireless communication using the channel. The channel setting unit 312 sets frequency used by the receiving unit 302 to the first channel during the active period. The channel setting unit 312 further sets the frequency used by the receiving unit 302 to the second channel during the preferential data period that does not overlap with the active period in the same frame. Accordingly, the communication terminals 300A receive data through the second channel during the preferential data period. More preferably, the communication terminals 300A continue to be in the reception state in the second channel during the preferential data period.

Next, referring to FIG. 14 to FIG. 19, timing of communication between the control point device 200A and the communication terminals 300A will be described in more detail.

Figure 14:
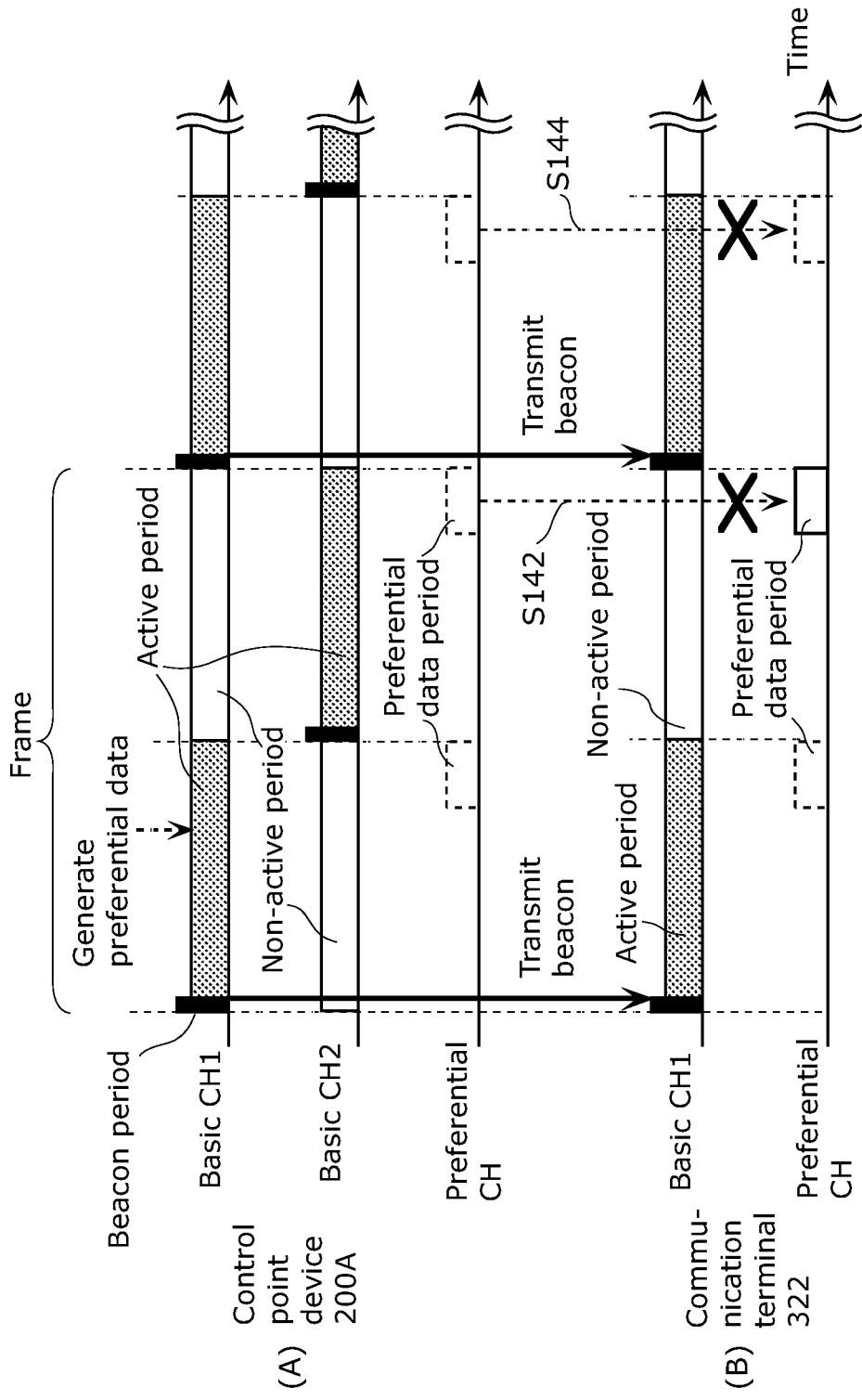
FIG. 14 is a first view showing details of a communication period between the control point device and the communication terminal.

FIG. 14 is a first view showing details of a communication period between the control point device 200A and the communication terminal 322 in this embodiment.

As shown in (A) of FIG. 14, the channel setting unit 214 of the control point device 200A divides the communication channel into three channels: the basic CH1, the basic CH2, and the preferential CH. Each of the basic CH1 and the basic CH2 corresponds to the above-mentioned first channel. The preferential CH corresponds to the above-mentioned second channel. In this embodiment, it is assumed that the channel setting unit 214 divides the communication channel into three channels by frequency division such that the channels correspond to respective different frequencies.

Each of the basic CH1 and the basic CH2 includes the plurality of frames. That the channel "includes" the frame means that the communication period in wireless communication using the channel includes the frame that is the repetitive unit time in the wireless communication. The beacon period, the active period, and the non-active period in this order are set to each frame included in each of the basic CH1 and the basic CH2.

The previously preferential data period is associated with each of the frames included in each of the basic CH1 and the basic CH2. The control point device 200A and the communication terminal 322 wirelessly communicate the preferential data during the preferential data period by using the preferential CH.

(B) of FIG. 14 is a view showing details of the communication period in wireless communication performed by the communication terminal 322 among the communication terminals 300A, to which the basic CH1 and the preferential CH are assigned.

Here, the communication terminal 322 executes the reception processing through the preferential CH during the preferential data period. However, in the case where the preferential data period overlaps the active period of the frame included in the basic CH1 that is a channel assigned to the communication terminal 322, the communication terminal 322 prioritizes the active period. Accordingly, the communication terminal 322 judges that the active period continues even during the preferential data period. As a result, as expressed in Step S144, for example, in the case where the preferential data is transmitted from the control point device 200 to the communication terminal 322 during the preferential data period overlapping with the active period, delay of the preferential data in wireless communication cannot be reduced.

Accordingly, the control point device 200A needs to transmit the preferential data to the communication terminal 322 during a period that is the non-active period and the preferential data period of the frame included in the channel assigned to the communication terminal 322.

However, for example, in the case where a CPU (Central Processing Unit) of the control point device 200A has an insufficient performance, there may be a case where the control point device 200A cannot transmit the preferential data during a proper period. For example, in the example shown in (A) of FIG. 14, the non-active period of the frame included in the basic CH1 becomes the active period of the frame included in the basic CH2. In this case, due to wireless communication during the active period of the frame included in the basic CH2, a CPU time of the control point device 200A may occupy even during the non-active period in the basic CH1. In this case, the control point device 200A cannot transmit the preferential data during the non-active period of the frame included in the basic CH1. As a result, the control point device 200A cannot transmit the preferential data during a proper period represented by Step S142 (S142). Accordingly, delay of the preferential data in wireless communication cannot be reduced.

To solve this problem, the control point device 200A in this embodiment shortens the length of the active period such that the active period does not overlap the preferential data period. At this time, based on the number of the communication terminals 300A assigned to each channel, the selecting unit 212A determines which of the active periods of the basic CH1 and the basic CH2 is to be shortened. This will be described in more detail.

FIG. 15 shows an example of the number of communication terminals 300 assigned to each channel in the wireless communication system 100A. The number of the communication terminals 300A assigned to the basic CH1 herein is 10. The number of the communication terminals 300A assigned to the basic CH2 is 5. Hereinafter, the number of the communication terminals 300A assigned to the channel is also referred to as the number of associated terminals.

In the wireless communication system 100A, the selecting unit 212A shortens the active period of the frame included in the basic CH2 to which the smaller number of associated terminals are assigned. This is due to that the normal data that cannot be transmitted/received in the frame may occur by shortening the active period. As a result, delay in transmission/reception of the normal data can occur. To minimize the number of frames causing such delay, the selecting unit 212A selects the channel to which the smaller number of associated terminals are assigned, as a channel including the active period to be preferentially shortened.

Figure 16:
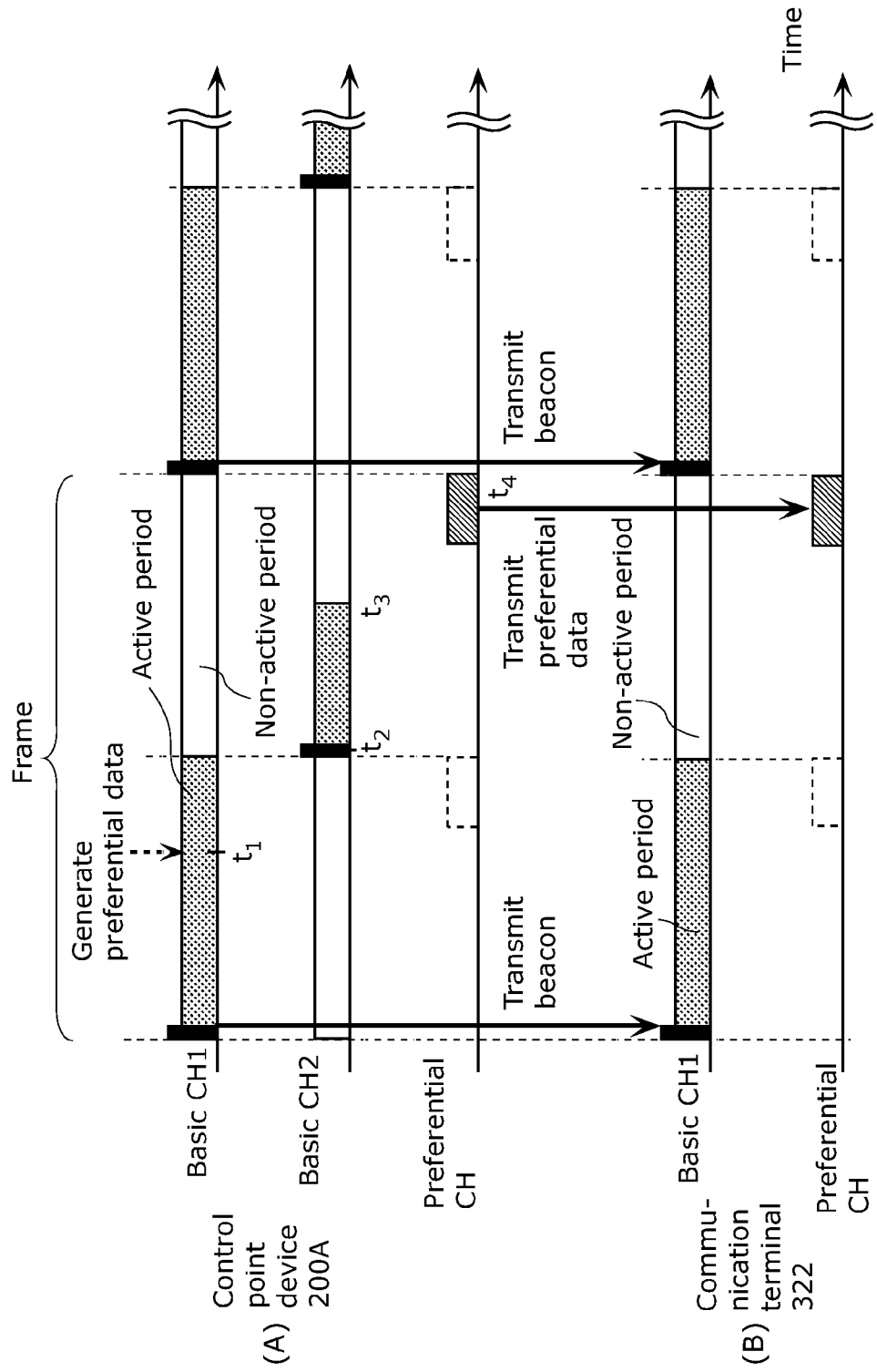
FIG. 16 is a second view showing details of the communication period between the control point device and the communication terminal in accordance with Embodiment 2.

FIG. 16 is a second view showing details of a communication period between the control point device 200A and the communication terminal 322 in this embodiment. The number of associated terminals in the basic CH1 and the basic CH2 in FIG. 16 are the same as that in FIG. 15.

As shown in (A) of FIG. 16, it is assumed that the preferential data is generated at Time t1. At this time, the number of associated terminals of the basic CH2 is 5, which is smaller than 10 as the number of associated terminals of the basic CH1. Accordingly, the selecting unit 212A selects the basic CH2 as the channel including the active period to be shortened. After that, the determining unit 206A determines to shorten the active period of the frame included in the basic CH2. Specifically, the active period is shortened such that a termination time of the active period of a frame starting from Time t2 is earlier than a start time of the preferential data period corresponding to the frame. More specifically, the termination time of the active period is determined to be Time t3. After that, the control point device 200A transmits the preferential data through the preferential CH at Time t4. Time t4 is included in the non-active period in the basic CH1 and the basic CH2, and in the preferential data period in the preferential CH. As a result, the wireless communication system 100A can reduce delay in transmission of the preferential data.

Figure 17:
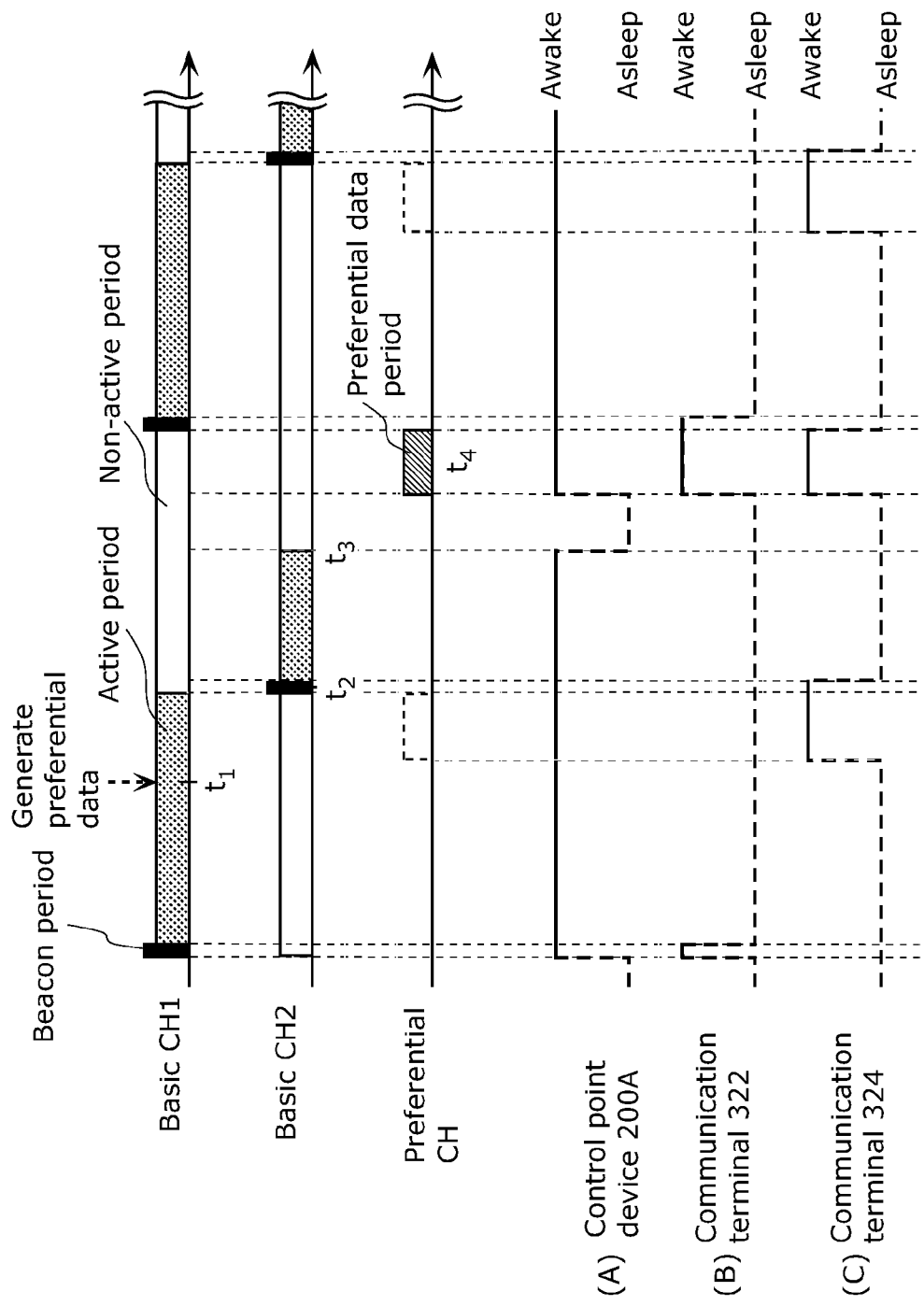
FIG. 17 is a view showing the power feeding state of wireless communication functions of the control point device and the communication terminal in FIG. 16.

FIG. 17 is a view showing an example of the power feeding state to the wireless communication functions of the control point device 200A and the communication terminal 322 in FIG. 16. Describing in more detail, (A) of FIG. 17 shows an example of the power feeding state to the wireless communication function of the control point device 200A. (B) of FIG.

17 shows an example of the power feeding state to the wireless communication function of the communication terminal 322. (C) of FIG. 17 shows an example of the power feeding state to the wireless communication function of the communication terminal 324. Awake and asleep in FIG. 17 are the same as those in FIG. 8 and thus, description thereof is omitted.

As shown in (A) of FIG. 17, the control point device 200A can be put into the sleeping state only while the non-active period of the basic CH1, the non-active period of the basic CH2, and a period other than the preferential data period of the preferential CH overlap one another. During the other periods, the control point device 200A is put into the waking state.

As shown in (B) of FIG. 17, the communication terminal 322 is put into the waking state during the beacon period of the basic CH1. The communication terminal 322 is also put into the waking state only while the non-active period of the basic CH1 and the preferential data period of the preferential CH overlap with each other. During the other periods, the communication terminal 322 may be put into the sleeping state.

As shown in (C) of FIG. 17, the communication terminal 324 is put into the waking state during the beacon period of the basic CH2. The communication terminal 324 is also put into the waking state during while the non-active period of the basic CH2 and the preferential data period of the preferential CH overlap with each other. During the other periods, the communication terminal 324 may be put into the sleeping state.

Figure 19:
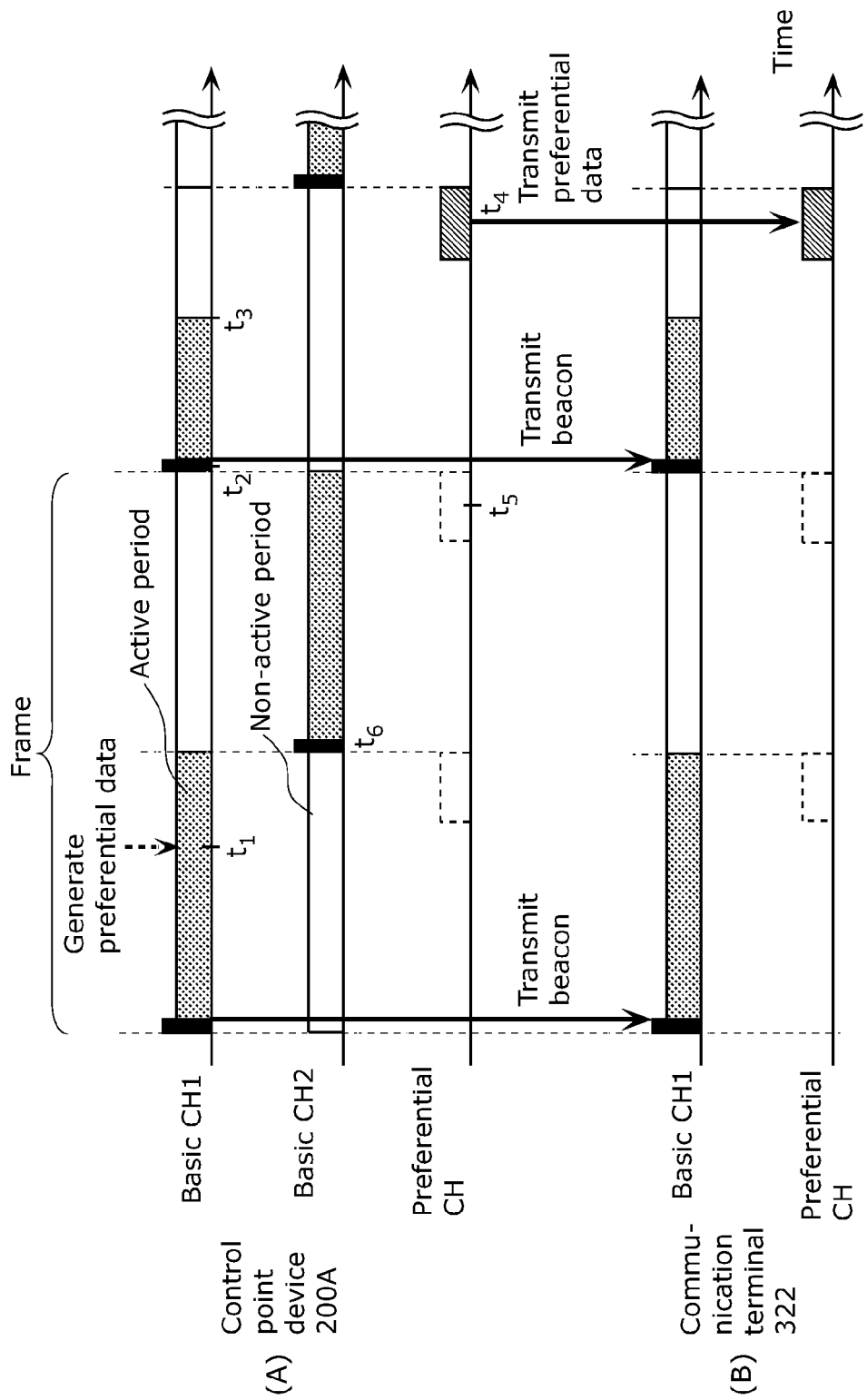
FIG. 19 is a third view showing details of the communication period between the control point device and the communication terminal in accordance with Embodiment 2.

Next, referring to FIG. 18 and FIG. 19, a case where the number of associated terminals in the basic CH2 is larger than the number of associated terminals in the basic CH1.

FIG. 18 shows another example of the number of the communication terminals 300 assigned to the channel in the wireless communication system 100A. Here, as shown in FIG. 18, the number of the communication terminals 300A assigned to the basic CH1 is 5. The number of the communication terminals 300A assigned to the basic CH2 is 30.

FIG. 19 is a third view showing details of the communication period between the control point device 200A and the communication terminal 322 in this embodiment. The number of associated terminals in the basic CH1 and the basic CH2 in FIG. 19 is the same as that in FIG. 18.

It is assumed that, as shown in (A) of FIG. 19, the preferential data is generated at Time t1. At this time, the number of associated terminals in the basic CH1 is 5, which is smaller than 30 as the number of associated terminals in the basic CH2. Accordingly, the selecting unit 212A selects the basic CH1 as the channel in which the active period should be shortened. After that, the determining unit 206A determines to shorten the active period included in the basic CH1. Specifically, the active period is shortened such that a termination time of the active period of a frame stating from Time t2 is earlier than a start time of the preferential data period corresponding to the frame. More specifically, the termination time of the active period is determined to be Time t3. After that, the control point device 200A transmits the preferential data through the preferential CH at Time t4. Time t4 is included in the non-active periods in the basic CH1 and the basic CH2, and in the preferential data period in the preferential CH. Accordingly, the wireless communication system 100A can reduce delay in transmission of the preferential data.

In the description referring to FIG. 16 and FIG. 19, the selecting unit 212A selects the active period to be shortened based on only the number of associated terminals assigned to each channel. However, in the case where the delay time allowable to the preferential data is small, irrespective of the number of associated terminals, it is preferred to transmit the preferential data as soon as possible. For example, referring to FIG. 19, the allowable delay value of the preferential data generated at Time t1 may be small and therefore, the allowable delay value cannot be satisfied when the preferential data is transmitted at Time t4. In this case, even when the number of associated terminals in the basic CH1 is smaller than that in the basic CH2, it is preferred that the selecting unit 212A selects the basic CH2 as the target channel. Flow of processing by the selecting unit 212A in the case where the channel including the active period to be shortened is selected on the basis of the number of associated terminals assigned to each channel and the allowable delay value of each preferential data will be described with reference to FIG. 20.

Figure 20:
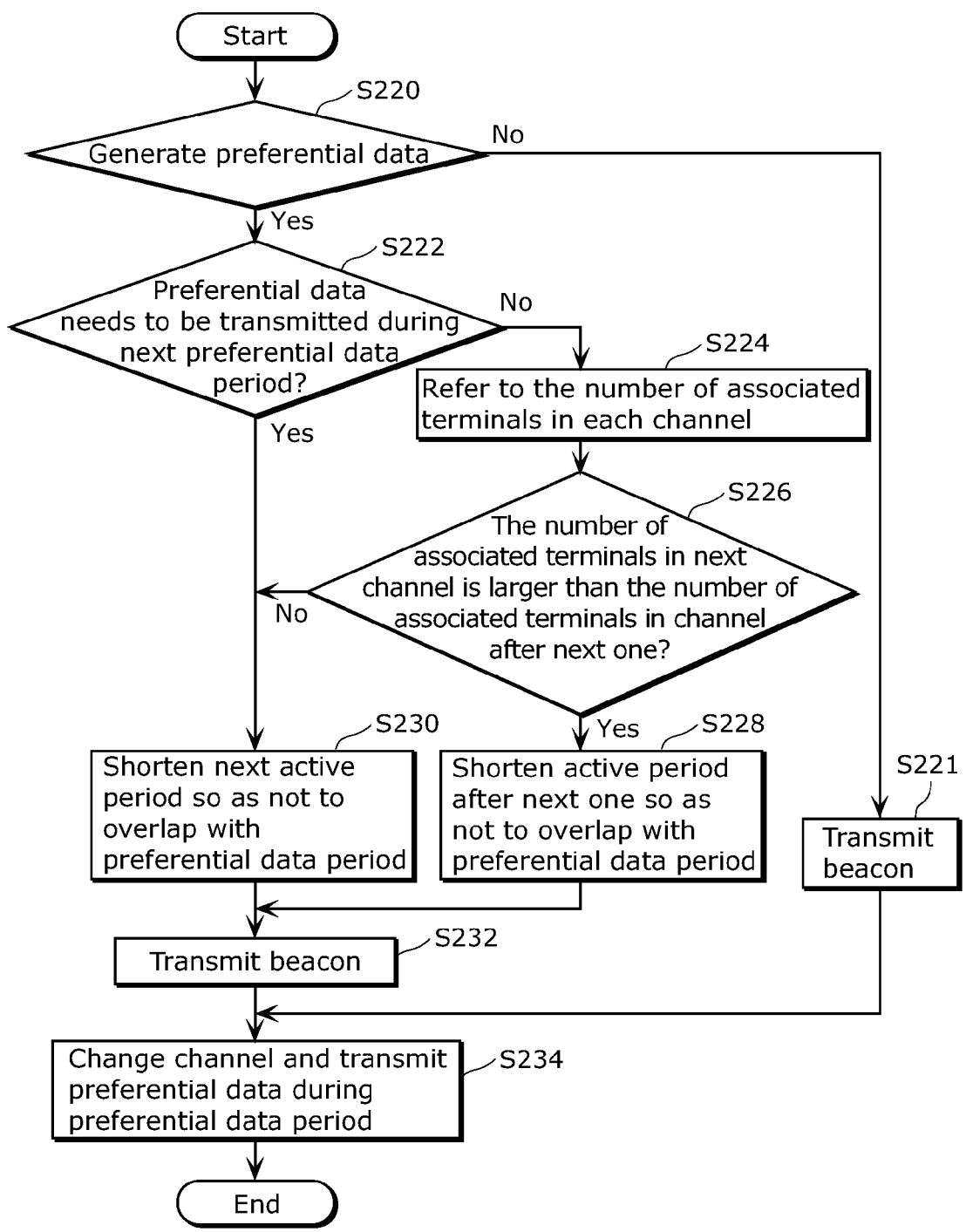
FIG. 20 is a flow chart showing an example of flow of processing executed by a selecting unit and a determining unit in accordance with Embodiment 2.

FIG. 20 is a flow chart showing an example of flow of processing by the selecting unit 212A and the determining unit 206A in accordance with this embodiment.

First, while the preferential data generating unit 204 does not generate the preferential data (No in S220), the beacon generating unit 208A designates a predetermined length of the active period to generate a beacon. The generated beacon is transmitted by the transmitting unit 210A (S221).

On the contrary, in the case where the preferential data generating unit 204 generates the preferential data (Yes in S220), the selecting unit 212A judges whether or not the preferential data should be transmitted in the next preferential data period (S222). Specifically, it is judged whether or not a delay time in the case where the preferential data is transmitted during the preferential data period after the next one exceeds the allowable delay value set to the preferential data. More specifically, referring to FIG. 19, it is judged whether or not the allowable delay value set to the preferential data generated at Time t1 is larger than t4−t1. In the case where the allowable delay value is larger than t4−t1, even when the preferential data is transmitted during the preferential data period after the next one, the delay time does not exceed the allowable delay value. Accordingly, the selecting unit 212A judges that the preferential data need not be transmitted during the next preferential data period (No in S222). In the case where the allowable delay value is smaller than t4−t1, the selecting unit 212A judges that the preferential data should be transmitted during the next preferential data period (Yes in S222).

In the case where the selecting unit 212A judges that the preferential data need be transmitted during the next preferential data period (Yes in S222), the determining unit 206A shortens the length of the next active period so as not to overlap with the preferential data period (S230).

In the case where the selecting unit 212A judges that the preferential data need not be transmitted in the next preferential data period (No in S222), the selecting unit 212A refers to the number of associated terminals for each channel (S224). The number of associated terminals for each channel may be acquired from the number of units storing unit 216, or may be acquired from the channel setting unit 214. After that, the selecting unit 212A judges whether or not the number of associated terminals in the channel through which the next beacon is transmitted is larger than the number of associated terminals in the channel through which the beacon after the next one is transmitted (S226). For example, referring to FIG. 19, in the case where the preferential data is generated at Time t1, the selecting unit 212A judges whether or not the number of associated terminals in the basic CH2 through which the next beacon is transmitted at Time t6 is larger than the number of associated terminals in the basic CH1 through which the beacon after the next one is transmitted at Time t2 (S226).

In the case where the number of associated terminals in the channel through which the next beacon is transmitted is larger than the number of associated terminals in the channel through which the beacon after the next one is transmitted (Yes in S226), the selecting unit 212A selects the channel through which the beacon after the next one is transmitted as the target channel. After that, the determining unit 206A shortens the length of the active period in the channel through which the beacon after the next one is transmitted (S228). On the contrary, in the case where the number of associated terminals in the channel through which the next beacon is transmitted is not larger than the number of associated terminals in the channel through which the beacon after the next one is transmitted (No in S226), the selecting unit 212A selects the channel through which the next beacon is transmitted as the target channel. After that, the determining unit 206A shortens the length of the active period in the channel in which the next beacon is transmitted, from a predetermined length (S230).

Next, the determining unit 206A designates the shortened length of the active period, and the beacon generating unit 208A generates a beacon. After that, the transmitting unit 210A transmits the generated beacon to the channel corresponding to the frame including the shortened active period (S232).

Finally, the transmitting unit 210A transmits the preferential data through the preferential CH during the preferential data period (S234). At this time, in the case where it is determined in Step S230, that the active period in the channel through which the next beacon is transmitted is shortened, the preferential data is transmitted during the next preferential data period. In other words, the preferential data is transmitted during the preferential data period associated with the frame in which the next beacon is transmitted. For example, referring to FIG. 16, in the case where the active period is shortened so as to terminate at Time t3, the transmitting unit 210A transmits the preferential data through the preferential CH at Time t4 during the preferential data period associated with the frame including the beacon transmitted at Time t2.

In the case where it is determined in Step S228 that the active period in the channel through which the beacon after the next one is transmitted is shortened, the preferential data is transmitted during the preferential data period after the next one. In other words, the preferential data is transmitted during the preferential data period associated with the frame including the beacon after the next one. For example, referring to FIG. 19, in the case where the active period is shortened so as to terminate at Time t3, the transmitting unit 210A transmits the preferential data through the preferential CH at Time t4 during the preferential data period associated with the frame including the beacon transmitted at Time t2.

The flow of the processing shown in FIG. 20 is based on the premise that, as shown in FIG. 16 and FIG. 19, two channels: the basic CH1 and the basic CH2 are used as the first channels. However, more channels can be used as the first channels.

Figure 21:
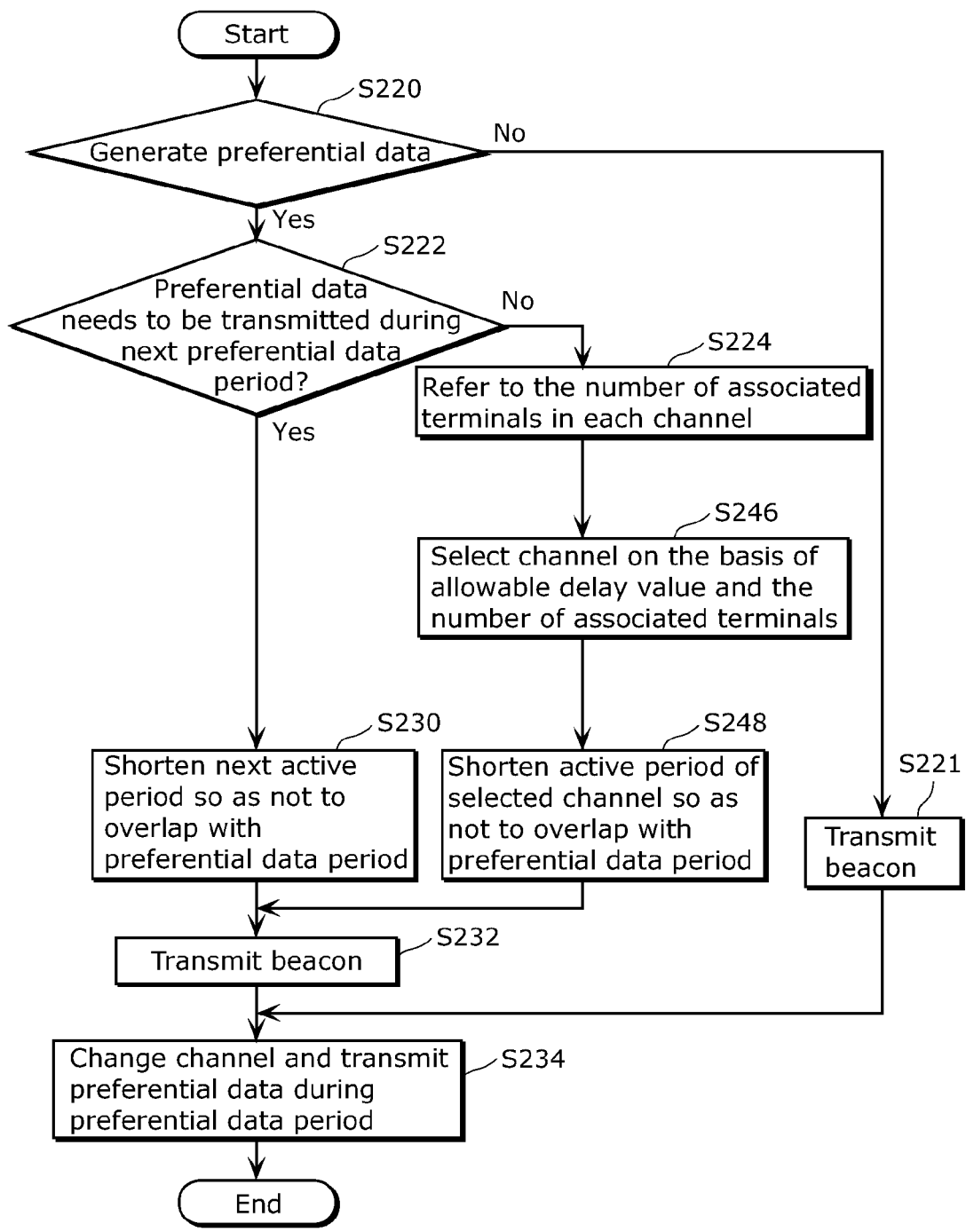
FIG. 21 is a flow chart showing an example of the flow of the processing executed by the selecting unit and the determining unit in the case where three or more channels are included as the first channels in Embodiment 2.

FIG. 21 is a view showing an example of flow of processing executed by the selecting unit 212A and the determining unit 206A in the case where three or more channels are included as the first channels. The same steps of executing the same processing as those in FIG. 20 are given the same reference numerals and thus, detailed description thereof is omitted.

In the case where three or more channels are used as the first channels, the selecting unit 212A refers to the number of associated terminals for each channel (S224). The selecting unit 212A refers to the allowable delay value set for each generated preferential data.

Then, the selecting unit 212A selects the channel in which the active period is shortened on the basis of the allowable delay value and the number of associated terminals (S226). Specifically, in the case where the $2^{nd}$-type data is transmitted during the preferential data period associated with the frame for each of the frames included in the first channels, the selecting unit 212A judges whether or not the delay time of the $2^{nd}$-type data is smaller than the allowable delay value. After that, among the first channels including the frame judged that the delay time is smaller than the allowable delay value, the first channel including the smaller number of the assigned communication terminals is selected as the target channel.

The selecting unit 212A may select the channel including the smallest number of the assigned communication terminals as well as the channel that falls within a predetermined ranking in terms of the number of the assigned communication terminals, as the target channel including the smaller number of the assigned communication terminals. The selecting unit 212A may select the channel including the predetermined number of the assigned communication terminals or smaller as the target channel.

After that, the determining unit 206A shortens the active period such that the active period of the frame included in the target channel does not overlap with the preferential data period associated with the frame (S248).

As has been described, in the control point device 200A and the communication terminals 300A in accordance with this embodiment, the selecting unit 212 determines the active period to be shortened to transmit the preferential data on the basis of the number of associated terminals for each channel and the allowable delay value set to the preferential data. As a result, the preferential data can be transmitted/received so as to satisfy the allowable delay value set to the preferential data while minimizing the effect on transmission/reception of the normal data.

The selecting unit 212A in accordance with Embodiment 2 of the present invention may select the channel following the channel in which the preferential data is generated as the target channel at all times. With this configuration, the delay time of the preferential data can be minimized at all times. In the case where variation in the number of associated terminals among the first channels is smaller than a predetermined threshold, the selecting unit 212A may select the channel following the channel in which the preferential data is generated as the target channel. In the case where the variation in the number of associated terminals among the channels, even when any channel is used as the target channel, the effect on transmission/reception of the normal data is almost uniform.

Figure 22:
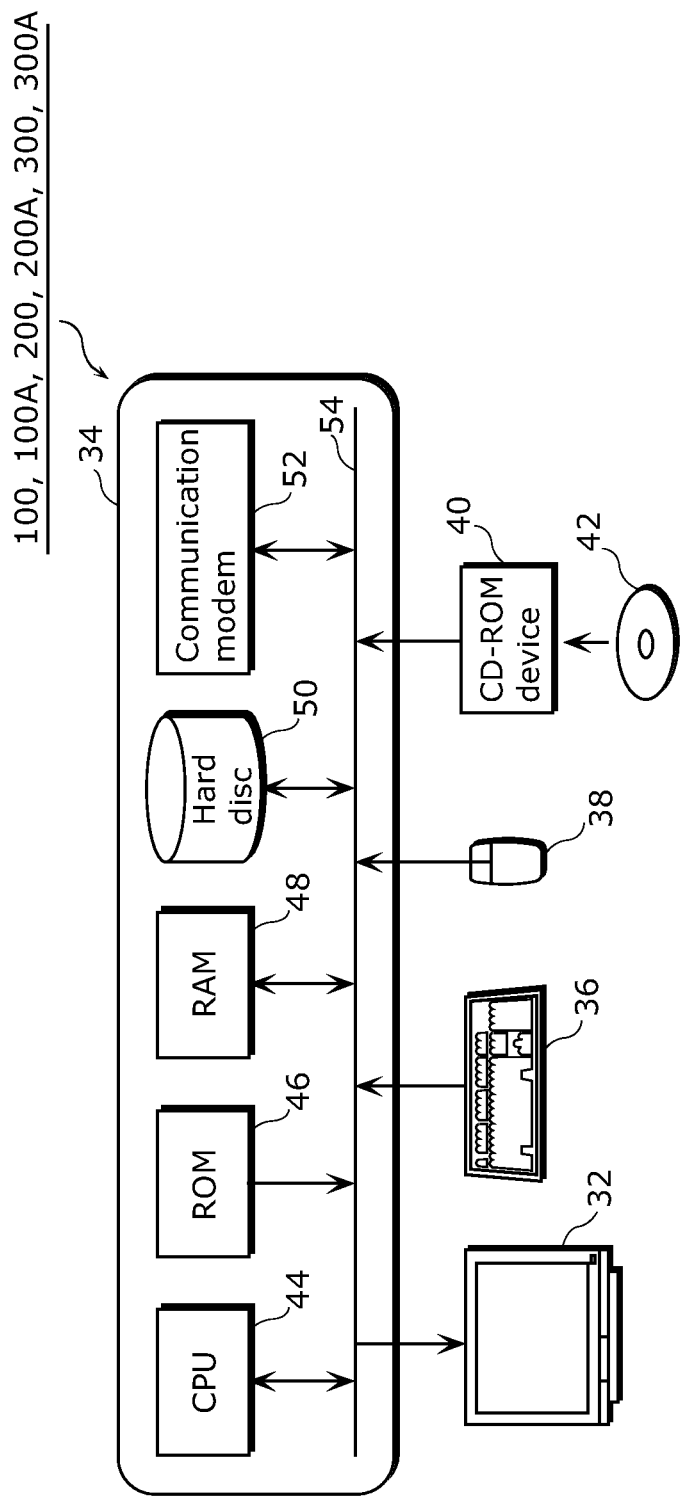
FIG. 22 is a block diagram showing the hardware structure of a computer system realizing the control point device and the like in accordance with Embodiments 1 and 2 of the present invention.

The control point device 200, the control point device 200A, the communication terminals 300, the communication terminals 300A, the wireless communication system 100, and the wireless communication system 100A in Embodiments 1 and 2 can be implemented by a computer. Hereinafter, the control point device 200, the control point device 200A, the communication terminals 300, the communication terminals 300A, the wireless communication system 100, and the wireless communication system 100A are referred to as the control point device 200 and so on. FIG. 22 is a block diagram showing a hardware structure of a computer system realizing the control point device 200 and the like.

The control point device 200 and the like include a computer 34, a keyboard 36 and a mouse 38 that provide an instruction to the computer 34, a display 32 that presents information on a calculation result of the computer 34 and the like, and a CD-ROM (Compact Disc-Read Only Memory)

device 40 and a communication modem (not shown) that read a program executed by the computer 34.

The program executed by the control point device 200 and the like is stored in a CD-ROM 42 as a computer-readable medium, and is read by the CD-ROM device 40. Alternatively, the program is read by a communication modem 52 via a computer network.

The computer 34 includes a CPU (Central Processing Unit) 44, a ROM (Read Only Memory) 46, a RAM (Random Access Memory) 48, a hard disc 50, the communication modem 52, and a bus 54.

The CPU 44 performs a program read via the CD-ROM device 40 or the communication modem 52. The ROM 46 stores a program and data that are necessary for the operation of the computer 34. The RAM 48 stores data such as parameters at execution of the program. The hard disc 50 stores the program and data. The communication modem 52 communicates with another computer via a computer network. The bus 54 interconnects the CPU 44, the ROM 46, the RAM 48, the hard disc 50, the communication modem 52, the display 32, the keyboard 36, the mouse 38, and the CD-ROM device 40.

Some or all of the constituents of each of the above-mentioned devices may be each configured of one system LSI (Large Scale Integration). The system LSI is a super-multi-functional LSI manufactured by integrating a plurality of constituents, and specifically, is a computer system including a microprocessor, a ROM, a RAM (Random Access Memory) and so on. A computer program is stored in the ROM. The microprocessor operates according to the computer program, resulting in that the system LSI performs its function.

Some or all of the constituents of each of the above-mentioned devices may be configured of IC card or a single module, which can be detachable from each of the devices. The IC card or the module is a computer system including a microprocessor, ROM, RAM and so on. The IC card or the module may include the above-mentioned super-multifunctional LSI. The microprocessor operates according to the computer program, thereby causing the IC card or the module to perform its function. The IC card or the module may have tamper proofness.

The present invention may be the above-mentioned method. Alternatively, the present invention may be a computer program for causing the computer to perform the method. Alternatively, the present invention may be a digital signal formed of the computer program.

The present invention may be a computer-readable recording medium on which the computer program or the digital signal is recorded, for example, a flexible disc, a hard disc, a CD-ROM, an MO, a DVD, a DVD-ROM, a DVD-RAM, a BD (Blue-ray Disc (registered mark)), a memory card such as a USB memory and an SD card, and a semiconductor memory. The present invention may be the digital signal recorded in the recording medium.

The present invention may be a device that transmits the computer program or the digital signal via a telecommunication line, a wireless or wired communication line, a network represented by the Internet, data broadcasting, or the like.

The present invention may be a computer system including a microprocessor and a memory, the memory may store a computer program, and the microprocessor operates according to the computer program.

By transferring the program or the digital signal recorded in the recording medium, or transferring the program or the digital signal via the network, the present invention may be implemented by another independent computer system.

The embodiments disclosed herein are illustrative in all points, and are not limiting. The scope of the present invention is defined by CLAIMS, not the above description, and includes all changes within the meaning and scope equivalent to CLAIMS.

In each of the above-mentioned embodiments, each constituent may be configured of a dedicated hardware, or may be realized by executing a software program suitable for each constituent. A program execution unit such as a CPU or a processor may read and execute a software program recorded in a recording medium such as a hard disc or a semiconductor memory to realize each constituent. The software for realizing the communication control system and the communication device in the above-mentioned embodiments is a following program.

That is, this program causes the computer to execute processing including: generating preferential data that is $2^{nd}$-type data, the $2^{nd}$-type data being different from $1^{st}$-type data wirelessly communicated between the controller and the communication terminal; determining a length of an active period included in a frame that is repetitive unit time, the active period being a period during which the controller communicates with the terminal in the frame; generating a broadcasting signal including information corresponding to the determined length of the active period; transmitting the broadcasting signal to the terminal on a frame basis by wireless communication with the terminal, and transmitting the $1^{st}$-type data during the active period, wherein in the determining, the length of the active period is shortened in the case where the $2^{nd}$-type data is generated in the generating of preferential data, and a preferential data period is set in an ex-active period obtained by the shortening of the active period, the preferential data period being a period during which the $2^{nd}$-type data is transmitted, and in the transmitting, the $2^{nd}$-type data is transmitted to the terminal during the preferential data period.

This program causes the computer to execute a communicating method by a communication terminal in a wireless communication system that wirelessly communicates $1^{st}$-type data between a controller and the communication terminal during an active period included in a frame that is repetitive unit time, the method comprising: receiving a broadcasting signal including information corresponding to a length of the active period included in the frame from the controller; and causing the receiving unit to receive the data during a preferential data period predetermined for each frame that is a period during which the communication terminal is to receive the data, in the case where the active period corresponding to the received broadcasting signal and the preferential data period do not overlap with each other in the same frame.

INDUSTRIAL APPLICABILITY

The present invention can apply the control point device. In particular, the present invention can apply the control point device in a wireless communication system that wirelessly communicates data between the control point device and a communication terminal during an active period included in a frame that is repetitive unit time.

REFERENCE SIGNS LIST

32 display
34 computer
36 keyboard
38 mouse
40 CD-ROM device
42 CD-ROM 44 CPU
46 ROM
48 RAM
50 hard disc
52 communication modem
54 bus
100, 100A, 1000 wireless communication system
150 network
200, 200A, 1001 control point device
202 normal data generating unit
204 preferential data generating unit
206, 206A determining unit
208, 208A beacon generating unit
210, 210A transmitting unit
212, 212A selecting unit
214 channel setting unit
216 number of units storing unit
300, 300A, 300a, 300b, 300c, 300d, 300e, 322, 323, 324, 1002, 1003, 1004 communication terminal
302 receiving unit
304 control unit
306 preferential data processing unit
308 normal data processing unit
310 beacon analyzing unit
312 channel setting unit

The invention claimed is:

1. A controller comprising:
a normal data generating unit configured to generate $1^{st}$-type data;
a preferential data generating unit configured to generate $2^{nd}$-type data that is different from the $1^{st}$-type data;
a determining unit configured to determine a length of an active period included in a frame that is repetitive unit time, the active period being a period during which communication with a terminal in the frame is performed;
a signal generating unit configured to generate a broadcasting signal including information corresponding to the determined length of the active period; and
a transmitting unit configured to transmit the broadcasting signal to the terminal on a frame basis by wireless communication with the terminal, and to transmit the $1^{st}$-type data during the active period,
wherein the determining unit is configured to shorten the length of the active period in the case where the preferential data generating unit generates the $2^{nd}$-type data as compared to the case where the preferential data generating unit does not generate the $2^{nd}$-type data, and to set a preferential data period in an ex-active period obtained by the shortening of the active period, the preferential data period being a period during which the $2^{nd}$-type data is transmitted, and
the transmitting unit is configured to transmit the $2^{nd}$-type data to the terminal during the preferential data period.

2. The controller according to claim 1,
wherein the signal generating unit is configured to generate a first broadcasting signal including information corresponding to the shortened length of the active period, which is determined by the determining unit, and
the transmitting unit is configured to transmit the $1^{st}$-type data during the active period, transmit the first broadcasting signal, and transmit the $2^{nd}$-type data during the preferential data period included in a frame subsequent to a frame in which the first broadcasting signal is transmitted.

3. The controller according to claim 2,
wherein the transmitting unit is configured to transmit the first broadcasting signal in a frame next to a frame in which the $2^{nd}$-type data is generated, and transmit the $2^{nd}$-type data during the preferential data period included in the same frame that is the frame in which the first broadcasting signal is transmitted.

4. The controller according to claim 1,
wherein the frame includes the active period and a non-active period in which wireless communication of the $1^{st}$-type data between the controller and the communication terminal is not performed, and
the determining unit is configured to shorten the length of the active period from a predetermined length of the active period to cause the non-active period of a predetermined time or more to be included before the preferential data period included in the same frame.

5. The controller according to claim 1, wherein
during the preferential data period, the communication terminal is in a reception state at all times.

6. The controller according to claim 1,
wherein the wireless communication system further includes:
the plurality of communication terminals;
a channel setting unit configured to divide a communication channel of the wireless communication into a plurality of first channels, and assign at least one of the first channels to each of the plurality of communication terminals; and
a selecting unit configured to select, as a target channel, a channel to which a smaller number of the communication terminals are assigned from among the first channels,
wherein each of the first channels includes the plurality of frames as the repetitive unit time in the wireless communication using the channel,
the preferential data period associated with each of the frames included in each of the first channels is previously determined,
the signal generating unit is configured to generate the broadcasting signal including information corresponding to the length of the active period, for each of the frames included in each of the first channels,
the transmitting unit is configured to transmit the broadcasting signal through the first channel, for each of the frames included in each of the first channels, and
the determining unit is configured to shorten the length of the active period included in at least one first frame in the plurality of frames included in the target channel from a predetermined length of the active period, in the case where the preferential data generating unit generates the $2^{nd}$-type data, thereby preventing the active period from overlapping with the preferential data period associated with the first frame.

7. The controller according to claim 6,
wherein the channel setting unit is configured to divide in a frequency domain the communication channel of the wireless communication into the first channels and a second channel that is different from the first channels and serves to transmit and receive the $2^{nd}$-type data, and to assign at least one of the first channels and the second channel to each of the plurality of communication terminals, and
the communication terminals are in a reception state in the second channel during the preferential data period.

8. The controller according to claim 7,
wherein the signal generating unit is configured to generate a second broadcasting signal that is a broadcasting signal including information corresponding to the shortened length of the active period, which is determined by the determining unit, and
the transmitting unit is configured to transmit the second broadcasting signal in the first frame, and transmit the $2^{nd}$-type data during the preferential data period associated with the first frame through the second channel.

9. The controller according to claim 6,
wherein the selecting unit is configured to refer to a predetermined allowable delay value that is a delay time allowable for reception of the $2^{nd}$-type data by the communication terminal, to judge whether or not the delay time of the $2^{nd}$-type data is less than the allowable delay value for each of the frames included in the first channels in the case where the $2^{nd}$-type data is transmitted during the preferential data period associated with the frame, and select, as the target channel, the first channel to which a smaller number of the communication terminals are assigned from among the first channels including the frames judged to include the delay time less than the allowable delay value.

10. A wireless communication system comprising:
the controller according to claim 1; and
a communication terminal in a wireless communication system that wirelessly communicates $1^{st}$-type data between a controller and a communication terminal during an active period included in a frame that is repetitive unit time, the communication terminal comprising:
a receiving unit configured to receive a broadcasting signal including information corresponding to a length of the active period in the frame from the controller; and
a control unit configured to cause the receiving unit to receive the data during a preferential data period predetermined for each frame that is a period during which the communication terminal is to receive the data, in the case where the active period corresponding to the received broadcasting signal and the preferential data period do not overlap with each other in the same frame.

11. A communication terminal in a wireless communication system that wirelessly communicates $1^{st}$-type data between a controller and a communication terminal during an active period included in a frame that is repetitive unit time, the communication terminal comprising:
a receiving unit configured to receive a broadcasting signal including information corresponding to a length of the active period in the frame from the controller; and
a control unit configured to cause the receiving unit to receive the data during a preferential data period predetermined for each frame that is a period during which the communication terminal is to receive the data, in the case where the active period corresponding to the received broadcasting signal and the preferential data period do not overlap with each other in the same frame; and
a channel setting unit configured to divide in a frequency domain a communication channel of the wireless communication into a first channel for wirelessly communicating the $1^{st}$-type data, the first channel including a plurality of frames as repetitive unit time in the wireless communication using the channel, and a second channel for receiving $2^{nd}$-type data that is different from the $1^{st}$-type data, to set a frequency used by the receiving unit to the first channel during the active period, and to set the frequency used by the receiving unit to the second channel during the preferential data period that does not overlap with the active period in the same frame.

12. A communicating method for use in a controller, the method comprising:
generating preferential data that is $2^{nd}$-type data, the $2^{nd}$-type data being different from $1^{st}$-type data wirelessly communicated between the controller and a communication terminal;
determining a length of an active period included in a frame that is repetitive unit time, the active period being a period during which the controller communicates with the terminal in the frame;
generating a broadcasting signal including information corresponding to the determined length of the active period;
transmitting the broadcasting signal to the terminal on a frame basis by wireless communication with the terminal, and transmitting the $1^{st}$-type data during the active period,
wherein in the determining, the length of the active period is shortened in the case where the $2^{nd}$-type data is generated in the generating of preferential data, and a preferential data period is set in an ex-active period obtained by the shortening of the active period, the preferential data period being a period during which the $2^{nd}$-type data is transmitted, and
in the transmitting, the $2^{nd}$-type data is transmitted to the terminal during the preferential data period.

13. A computer-readable non-transitory recording medium for causing a computer to perform the communicating method for use in the controller according to claim 12.

14. An integrated circuit comprising:
a normal data generating unit configured to generate $1^{st}$-type data;
a preferential data generating unit configured to generate $2^{nd}$-type data that is different from the $1^{st}$-type data;
a determining unit configured to determine a length of an active period included in a frame that is repetitive unit time, the active period being a period during which communication with a terminal in the frame is performed;
a signal generating unit configured to generate a broadcasting signal including information corresponding to the determined length of the active period; and
a transmitting unit configured to transmit the broadcasting signal to the terminal on a frame basis by wireless communication with the terminal, and to transmit the $1^{st}$-type data during the active period,
wherein the determining unit configured to shorten the length of the active period in the case where the preferential data generating unit generates the $2^{nd}$-type data, and to set a preferential data period in an ex-active period obtained by the shortening of the active period, the preferential data period being a period during which the $2^{nd}$-type data is transmitted, and
the transmitting unit is configured to transmit the $2^{nd}$-type data to the terminal during the preferential data period.

15. A communicating method by a communication terminal in a wireless communication system that wirelessly communicates $1^{st}$-type data between a controller and the communication terminal during an active period included in a frame that is repetitive unit time, the communication terminal including a receiving unit, the method comprising:
receiving a broadcasting signal including information corresponding to a length of the active period included in the frame from the controller;

causing the receiving unit to receive the data during a preferential data period predetermined for each frame that is a period during which the communication terminal is to receive the data, in the case where the active period corresponding to the received broadcasting signal and the preferential data period do not overlap with each other in the same frame; and dividing in a frequency domain a communication channel of the wireless communication into a first channel for wirelessly communicating the $1^{st}$-type data, the first channel including a plurality of frames as repetitive unit time in the wireless communication using the channel, and a second channel for receiving $2^{nd}$-type data that is different from the $1^{st}$-type data, to set a frequency used in said receiving to the first channel during the active period, and to set the frequency used in said receiving to the second channel during the preferential data period that does not overlap with the active period in the same frame.

16. A computer-readable non-transitory recording medium for causing a computer to perform the communicating method according to claim 15.

17. An integrated circuit in a wireless communication system that wirelessly communicates $1^{st}$-type data between a controller and a communication terminal during an active period included in a frame that is repetitive unit time, the integrated circuit comprising:

a receiving unit configured to receive a broadcasting signal including information corresponding to a length of the active period in the frame from the controller;

a control unit configured to cause the receiving unit to receive the data during a preferential data period predetermined for each frame that is a period during which the communication terminal is to receive the data, in the case where the active period corresponding to the received broadcasting signal and the preferential data period do not overlap with each other in the same frame; and a channel setting unit configured to divide in a frequency domain a communication channel of the wireless communication into a first channel for wirelessly communicating the $1^{st}$-type data, the first channel including a plurality of frames as repetitive unit time in the wireless communication using the channel, and a second channel for receiving $2^{nd}$-type data that is different from the $1^{st}$-type data, to set a frequency used by the receiving unit to the first channel during the active period, and to set the frequency used by the receiving unit to the second channel during the preferential data period that does not overlap with the active period in the same frame.

* * * * *